US011527146B2

(12) United States Patent
Bernotas et al.

(10) Patent No.: US 11,527,146 B2
(45) Date of Patent: Dec. 13, 2022

(54) DETECTING THREAT EVENTS

(71) Applicant: VERIZON PATENT AND LICENSING INC., Basking Ridge, NJ (US)

(72) Inventors: Emily Bernotas, Urbana, IL (US); Kima Kheirolomoom, Urbana, IL (US); Richard Pace, Champaign, IL (US); Jon Kilroy, Mahomet, IL (US); Aaron John Klish, Savoy, IL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/692,573

(22) Filed: Nov. 22, 2019

(65) Prior Publication Data

US 2021/0158685 A1    May 27, 2021

(51) Int. Cl.
  *G08B 25/00*    (2006.01)
  *G08B 17/12*    (2006.01)
  *G08B 29/18*    (2006.01)
  *G06F 16/28*    (2019.01)

(52) U.S. Cl.
  CPC ......... *G08B 25/006* (2013.01); *G06F 16/285* (2019.01); *G08B 17/12* (2013.01); *G08B 29/185* (2013.01)

(58) Field of Classification Search
  CPC .... G08B 25/006; G08B 29/185; G08B 17/12; G06F 16/285
  See application file for complete search history.

(56) References Cited

U.S. PATENT DOCUMENTS

| 8,760,290 | B2* | 6/2014 | Piett | G06Q 30/02 |
| | | | | 455/404.1 |
| 2015/0070166 | A1* | 3/2015 | Boyden | G08B 13/1672 |
| | | | | 340/540 |
| 2017/0337805 | A1* | 11/2017 | Eyring | G08B 13/1968 |
| 2018/0293864 | A1* | 10/2018 | Wedig | G08B 21/182 |
| 2019/0310997 | A1* | 10/2019 | Gratton | G06F 16/285 |
| 2020/0288295 | A1* | 9/2020 | Martin | H04W 4/022 |
| 2020/0334470 | A1* | 10/2020 | Abeykoon | G06V 10/96 |

* cited by examiner

*Primary Examiner* — James J Yang

(57) ABSTRACT

One or more computing devices, systems, and/or methods are provided. One or more first signals received from one or more first devices may be monitored. One or more first threat indicators within a first signal of the one or more first signals may be detected. One or more second signals may be analyzed to determine a probability of a threat event. One or more second devices of a plurality of devices may be selected, based upon the probability, for transmission of one or more messages associated with the threat event.

20 Claims, 10 Drawing Sheets

DETECTING THREAT EVENTS

BACKGROUND

Threats to human life, such as attacks, shootings, etc. sometimes occur in crowded places, such as sports venues, shopping venues, schools, transportation systems, etc.

SUMMARY

In accordance with the present disclosure, one or more computing devices and/or methods are provided. In an example, one or more first signals received from one or more first devices may be monitored. One or more first threat indicators within a first signal of the one or more first signals may be detected. One or more second signals may be analyzed to determine a probability of a threat event. One or more second devices of a plurality of devices may be selected, based upon the probability, for transmission of one or more messages associated with the threat event.

In an example, one or more first signals received from one or more first devices may be monitored. Information of a first signal of the one or more first signals may be classified as being associated with one or more first threat indicators based upon a comparison of the information of the first signal with one or more sets of features associated with one or more threats to safety. One or more second signals may be analyzed to determine a probability of a threat event. One or more second devices of a plurality of devices may be selected, based upon the probability, for transmission of one or more messages associated with the threat event.

In an example, one or more first signals received from one or more first devices may be monitored. One or more first threat indicators within a first signal of the one or more first signals may be detected. One or more second signals may be analyzed to determine a probability of a threat event. One or more messages associated with the threat event may be transmitted to one or more second devices based upon the probability.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
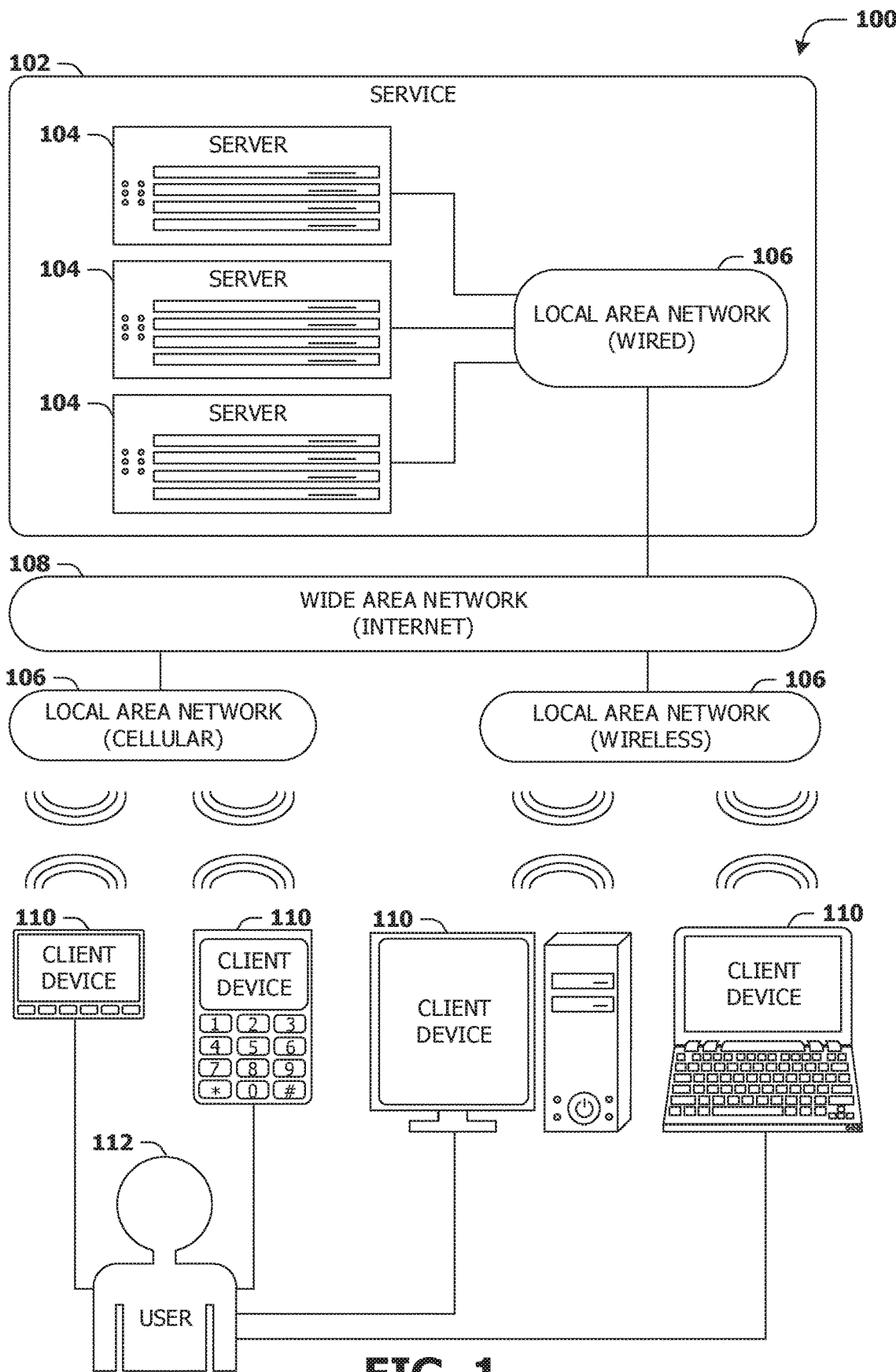
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
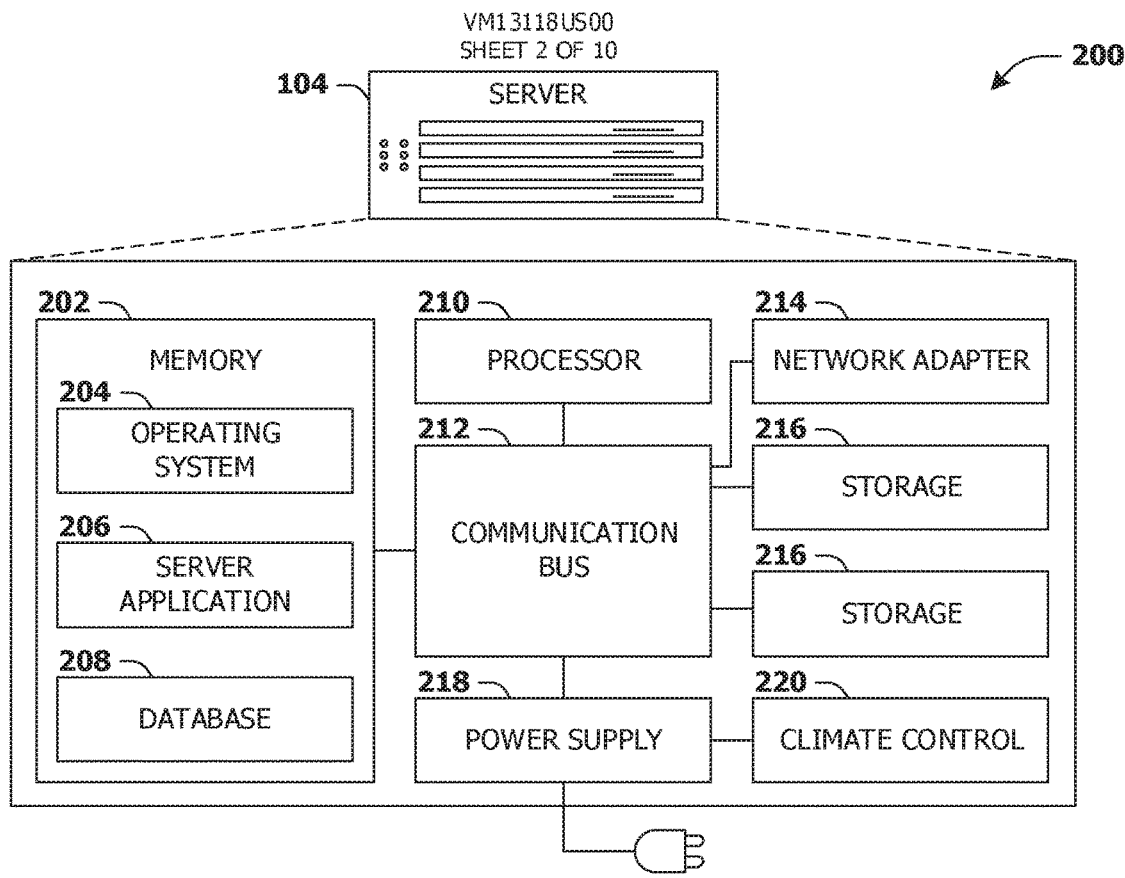
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
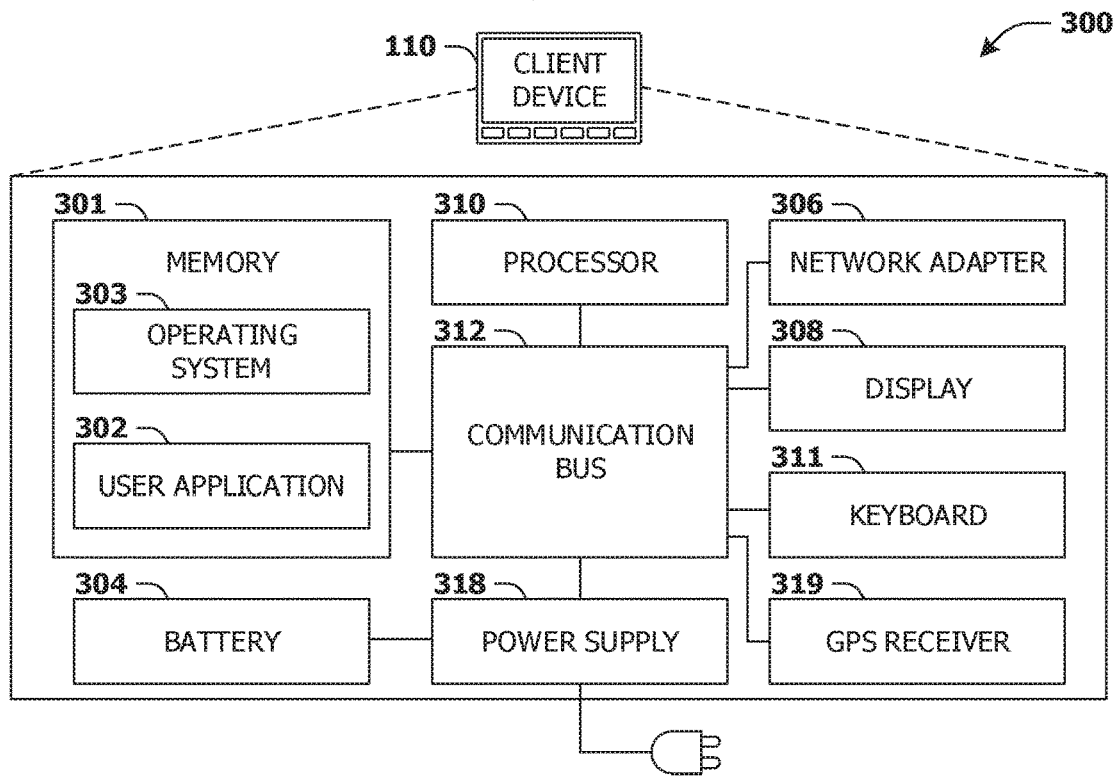
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for detecting threat indicators and sending alerts are provided. A threat indicator may correspond to an indicator of a threat event, such as a natural disaster (e.g., a fire, a flood, etc.), an attack (e.g., a shooting, a terrorist attack, etc.) and/or a different type of threat to safety and/or human life. In accordance with one or more of the techniques presented herein, one or more first signals received from one or more first devices may be monitored by a safety system. For example, the safety system may have authorization to monitor the one or more first signals. One or more first threat indicators within a first signal of the one or more first signals may be detected. For example, information of the first signal may be classified as being associated with the one or more first threat indicators based upon a comparison of the information of the first signal with one or more sets of features associated with one or more threats to safety. In an example, the first signal may comprise one or more of a video signal, an audio signal, an infrared signal, a biometric signal, etc. The one or more first threat indicators may correspond to one or more of a threat object (e.g., a firearm, an explosive device, etc.) comprised within the video signal, one or more sounds associated with a threat to safety, a muzzle flash comprised within the infrared signal, etc. The one or more second signals may be analyzed to determine a probability of a threat event. In some examples, the one or more second signals may be received from one or more devices associated with a location of a device from which the first signal is received. One or more first devices of a plurality of devices may be selected for transmission of one or more alert messages. The one or more first devices may belong to, for example, one or more of law enforcement, emergency personnel, people near the location that are in danger, etc.

Figure 4:
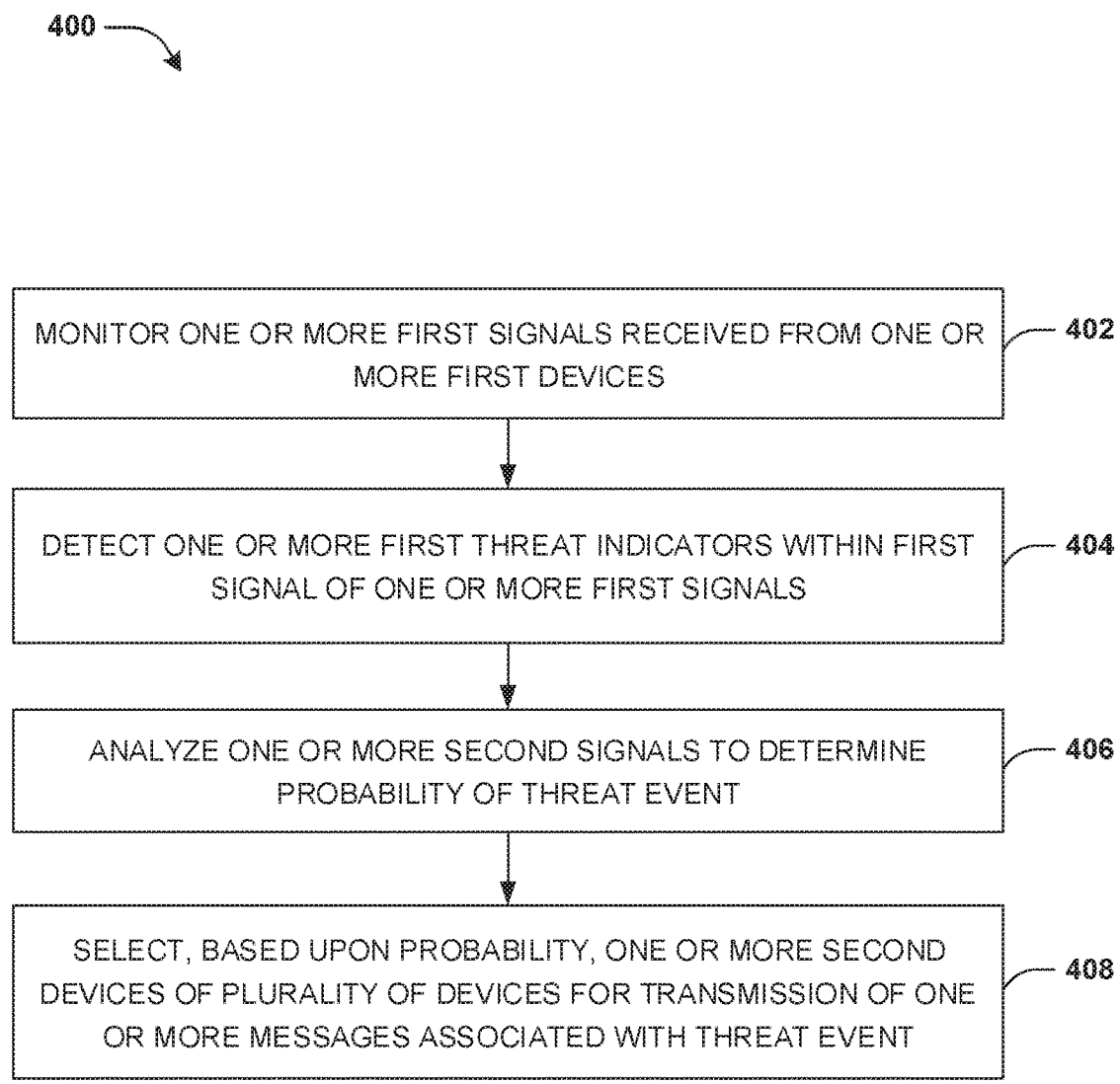
FIG. 4 is a flow chart illustrating an example method for detecting threat indicators and/or sending alerts.

An embodiment of detecting threat indicators and sending alerts is illustrated by an example method 400 of FIG. 4. A safety system is provided. The safety system may receive and/or monitor signals received from devices. At 402, one or more first signals received from one or more first devices may be monitored. The one or more first signals may comprise one or more image signals, one or more video signals, one or more audio signals, one or more infrared signals and/or one or more biometric signals. The one or more first devices may comprise a first device. A first signal of the one or more first signals may be received from the first device.

The first device may comprise one or more of a laptop, a smartphone, a wearable device, a communication device, etc. In some examples, the first device may receive a sensor signal from a first sensor. For example, the first sensor may correspond to a first camera, a first microphone, a first biometric sensor, a first infrared sensor and/or a different type of sensor. The first device may comprise the first sensor (e.g., the first sensor may be mounted on and/or embedded in the first device). Alternatively and/or additionally, the first sensor may be a standalone sensor. For example, the first sensor may be a security camera and/or a different type of camera, such as a webcam and/or an external camera.

The first sensor may be connected to the first device via a wired connection. Alternatively and/or additionally, the first sensor may be connected to the first device via a wireless connection. For example, the first sensor may transmit the sensor signal to the first device via a wireless local area network, such as a Wi-Fi network and/or a Bluetooth personal area network. Alternatively and/or additionally, the first sensor may transmit the sensor signal to the first device using Bluetooth Low Energy technology and/or Bluetooth mesh networking technology. Alternatively and/or additionally, the first sensor and the first device may be connected and/or may communicate via an Internet of Things (IoT) system.

In an exemplary scenario, the first sensor may comprise a security camera and/or the first device may comprise a communication device connected to the security camera. The first sensor may output the sensor signal (e.g., an image signal and/or a video signal) and/or the first device may receive the sensor signal from the first sensor. The first device may transmit the first signal based upon the sensor signal. The first signal may be the same as the sensor signal. Alternatively and/or additionally, the sensor signal may be processed to generate the first signal.

In an exemplary scenario, the first sensor may comprise a camera of a wearable device (e.g., a smart glasses computer comprising a camera, a headset comprising a camera, a smart watch comprising a camera, etc.) and/or the first device may comprise the wearable device and/or a device (e.g., a smartphone, a laptop, and/or a different client device) connected to the wearable device.

In an exemplary scenario, the first sensor may comprise a smartphone camera and/or the first device may comprise a smartphone (comprising the smartphone camera).

In an exemplary scenario, the first sensor may comprise a biometric sensor. The biometric sensor may be positioned on and/or within a body part of a user. The first device may comprise a wearable device (e.g., a smart glasses computer comprising a camera, a headset comprising a camera, a smart watch comprising a camera, etc.) that is connected to the first sensor and/or comprises the first sensor. The first sensor may output the sensor signal (e.g., a biometric signal indicative of one or more of body measurements of a person, heart activity of the person, a heart rate of the person, brain activity of the person, physical activity of the person, steps taken by the person, a speed at which the person is moving, etc.). The first device may receive the sensor signal from the first sensor. The first device may transmit the first signal based upon the sensor signal. The first signal may be the same as the sensor signal. Alternatively and/or additionally, the sensor signal may be processed to generate the first signal.

In an exemplary scenario, the first sensor may comprise an infrared sensor and/or the first device may comprise a communication device connected to the infrared sensor. The first sensor may output the sensor signal (e.g., an infrared signal) and/or the first device may receive the sensor signal from the first sensor. The first device may transmit the first signal based upon the sensor signal. The first signal may be the same as the sensor signal. Alternatively and/or additionally, the sensor signal may be processed to generate the first signal.

In some examples, the first device may continuously transmit a signal, such as the first signal, to the safety system. Alternatively and/or additionally, the first device may periodically transmit signals, such as the first signal, to the safety system. Alternatively and/or additionally, the first signal may be transmitted to the safety system responsive to detecting a transmission trigger.

In an example where the sensor signal is a video signal, the transmission trigger may correspond to motion within the video signal. For example, the first device may transmit the first signal to the safety system responsive to detecting motion within the video signal (e.g., one or more movements of one or more objects comprised in the video signal).

In an example, the transmission trigger may correspond to detection of one or more threat objects within a first image (e.g., the first image may correspond to an image captured via a camera and/or a video frame of a video recorded via the camera). For example, a threat object of the one or more threat objects may correspond to a firearm, an explosive device, a knife, and/or a different type of weapon. Alternatively and/or additionally, a threat object of the one or more threat objects may correspond to a fire. For example, the video and/or the image may be analyzed for detection of the one or more threat objects. In some examples, the one or more threat objects may be identified and/or detected within the first image by performing one or more image processing techniques and/or one or more computer vision techniques on the first image. For example, the first image may be analyzed using one or more object detection techniques (and/or one or more object segmentation techniques) to detect the one or more threat objects. Alternatively and/or additionally, the first image may be analyzed using one or more machine learning techniques to detect the one or more threat objects.

Alternatively and/or additionally, the first image may be analyzed to detect the one or more threat objects based upon one or more first object datasets. For example, an object dataset of the one or more first object datasets may correspond to a type of threat object (e.g., a type of weapon and/or a type of fire). An object dataset of the one or more first object datasets may comprise information associated with a type of threat object, such as an appearance of objects corresponding to the type of threat object, one or more parameters associated with objects corresponding to the type of threat object, colors associated with objects corresponding to the type of threat object, measurements associated with objects corresponding to the threat type of object, etc.

In some examples, the one or more threat objects may be identified and/or detected using one or more object segmentation techniques and/or one or more image segmentation techniques. For example, the first image may be segmented into multiple segments using the one or more object segmentation techniques and/or the one or more image segmentation techniques. The first image may be segmented into the multiple segments based upon one or more of color differences between portions of the first image, detected boundaries associated with the multiple segments, etc. In some examples, a segment of the multiple segments may be analyzed to determine an object associated with the segment. For example, an object of the one or more threat objects may be detected by comparing a segment of the multiple segments with the one or more first object datasets to determine whether the segment matches a type of threat object of the one or more first object datasets. In some examples, the one or more first object datasets may be retrieved from an object information database.

In some examples, responsive to detecting the one or more threat objects within the first image, the first device may transmit the first signal to the safety system. Alternatively and/or additionally, the first device may analyze the first image and/or one or more video frames of the video signal to determine whether the one or more threat objects are associated with law enforcement (e.g., police) (e.g., in an example where the one or more threat objects correspond to one or more weapons, it may be determined whether the one or more weapons belong to one or more law enforcement officials). For example, the first image and/or the one or more video frames may be analyzed based upon one or more second object datasets associated with law enforcement to determine whether the one or more threat objects are positioned adjacent to and/or near a law enforcement officer and/or a law enforcement object (e.g., a law enforcement object may correspond to one or more of a police car, a police horse, etc.). Responsive to determining that the one or more threat objects are associated with law enforcement, the first signal may not be transmitted to the safety system. For example, the first signal may be transmitted to the safety system responsive to determining that the first image and/or the one or more video frames do not comprise a law enforcement officer and/or that the one or more threat objects are not positioned adjacent to and/or near a law enforcement officer.

In an example, the transmission trigger may correspond to detection of motion of the first device and/or the first sensor. For example, the first device may transmit the first signal to the safety system responsive to detecting motion of the first device and/or the first sensor. The motion of the first device and/or the first sensor may be detected via a motion sensor configured to detect and/or measure motion of the first device and/or the first sensor. Alternatively and/or additionally, the motion of the first device and/or the first sensor may be detected via an acceleration sensor (e.g., an accelerometer) configured to detect and/or measure an acceleration of the motion of the first device.

In an example, the transmission trigger may correspond to detection of a trigger sound of one or more trigger sounds. For example, the first device may transmit the first signal to the safety system responsive to detecting the trigger sound. In some examples, the trigger sound may be detected via a microphone associated with the first device. For example, the first device may continuously and/or periodically monitor audio recorded by the microphone. In some examples, the first device may be configured to detect sounds and/or speech while monitoring the audio. Responsive to detecting a sound and/or speech, an audio segment comprising the sound and/or the speech may be extracted and/or analyzed. For example, the audio segment may be compared with the one or more trigger sounds to determine whether the audio segment matches (e.g., is similar to) a trigger sound of the one or more trigger sounds. Responsive to determining that the audio segment does not match a trigger sound of the one or more trigger sounds, the audio segment may be discarded (and/or the first device may continue monitoring audio recorded by the microphone).

In some examples, responsive to determining that the audio segment matches a trigger sound of the one or more trigger sounds, the first signal may be transmitted to the safety system. In some examples, the one or more trigger sounds may be associated with an occurrence of a threat event. For example, the one or more trigger sounds may correspond to one or more sounds of one or more gunshots, one or more sounds of one or more explosions, one or more phrases that a person may say when a threat event occurs, etc.

Alternatively and/or additionally, transmission of the first signal may be triggered based upon a comparison of the audio segment with one or more first audio features associated with an occurrence of a threat event. For example, the one or more first audio features may comprise one or more voice properties of a person when a threat event occurs. For example, the one or more voice properties may correspond to a speed at which a person speaks. Alternatively and/or additionally, the one or more voice properties may correspond to a pitch at which a person speaks and/or produces sound (e.g., one or more of a person screaming, crying, yelling, etc.). Alternatively and/or additionally, the one or more voice properties may correspond to a tone of voice of a person. Alternatively and/or additionally, the one or more voice properties may correspond to a power with which a person speaks and/or produces sound (e.g., a loudness with which a person one or more of speaks, yells, screams, cries, etc.). Alternatively and/or additionally, the one or more first audio features may be indicative of one or more types of sound produced by a person such as one or more of a rate at which a person breathes (e.g., inhales and/or exhales), an intensity of the breathing, a person crying, a person screaming, a person moaning, a person laughing, etc. Responsive to determining that one or more audio features of the audio segment match (and/or are similar to) one or more audio features of the one or more first audio features, the first device may transmit the first signal to the safety system.

In some examples, the first device may transmit the first signal and/or the safety system may monitor the first signal responsive to determining that the safety system is authorized to monitor the first signal. Whether the first device is authorized to transmit the first signal and/or whether the safety system is authorized to monitor the first signal may be determined based upon a location of the first device and/or a current time (e.g., a time of day and/or a day of the week).

For example, one or more authorization settings associated with transmission of monitoring signals associated with the first device, such as the first signal, may be received from a first client device. The first client device may be the first device. Alternatively and/or additionally, the first client device may be different than the first device.

In some examples, a graphical user interface of a first device may be controlled to display a safety interface. In some examples, the one or more authorization settings may be received via the safety interface. For example, the safety system may be provided with, via the safety interface, authorization to monitor one or more signals provided by the first device (and/or one or more signals provided by one or more other devices associated with the first client device) when the first device is within one or more authorized locations and/or during one or more times.

For example, a first location of the first device may be monitored to determine whether the first device is within a location of the one or more authorized locations. In some examples, the first location of the first device may comprise a first set of coordinates associated with the first device. For example, the first set of coordinates may comprise a first longitude coordinate of the first device and/or a first latitude coordinate of the first device. In some examples, the first location may be determined based upon location information associated with the first client device and/or the first camera.

The location information may be received from a wireless network (e.g., a WiFi network, a hotspot, a wireless access point (WAP), a network associated with a base station, etc.) that the first device is connected to. For example, the location information may comprise received signal strength indicators (RSSIs) associated with communications between the first device and the wireless network. Alternatively and/or additionally, the location information may comprise angle of arrival (AoA) information. One or more RSSI localization techniques and/or one or more trilateration techniques may be performed using the RSSIs and/or the AoA information to determine the first location of the first device.

Alternatively and/or additionally, the location information may comprise satellite navigation information comprising longitude measurements, latitude measurements and/or altitude measurements associated with locations of the first device. The satellite navigation information may be received from a satellite navigation system, such as a global navigation satellite system (GNSS) (e.g., Global Positioning System (GPS), Global Navigation Satellite System (GLONASS), Galileo, etc.). In some examples, the first location of the first device may be determined based upon merely the satellite navigation information. Alternatively and/or additionally, the first location may be determined based upon a combination of the satellite navigation information, the AoA information and/or the RSSIs.

Alternatively and/or additionally, the first location of the first device may be determined by analyzing one or more of a web-based calendar associated with the first device, one or more emails associated with the first device, one or more messages associated with the first device, social networking activity associated with the first device, etc. For example, the first location may be determined by analyzing calendar entries to identify that a calendar entry within the web-based calendar is indicative of the first location and/or a current time (e.g., the calendar entry may correspond to a time and place of a meeting and/or event scheduled by a first user associated with the first device). Alternatively and/or additionally, the first location may be determined by identifying an email, a message and/or a social media post indicative of the first user planning to be at the first location during a current time.

In some examples, a first authorization setting of the one or more authorization settings may correspond to the safety system having authorization to monitor one or more signals provided by the first device when the first device is within one or more types of areas. The one or more types of areas may correspond to one or more of a public area, a shopping venue, a mall, a school, a government building, a park, a place of worship, a workplace, a public transit station, etc. A location database may be analyzed based upon the first location to determine whether the first location is associated with a type of area of the one or more types of areas (e.g., whether the first location is within an area corresponding to the type of area). In an example, where the one or more types of areas comprises a school, a polygon associated with the school may be compared with the first location to determine whether the first location is within the school. For example, the polygon may comprise a representation (e.g., a geometrical representation) of geographical boundaries associated with school grounds of the school (e.g., the property may comprise one or more of a structure, a building, a construct, a field, a parking area, etc. associated with the school). For example, responsive to determining that the first location is within the school (and/or the polygon), the first signal may be transmitted by the first device and/or the safety system may monitor the first signal. Alternatively and/or additionally, the safety system may transmit a request for a monitoring signal to the first device responsive to determining that the first location is within a type of area of the one or more types of areas. The first device may transmit the first signal responsive to receiving the request. Alternatively and/or additionally, responsive to determining that the first location is not within a type of area of the one or more types of areas, the first signal may not be transmitted by the first device and/or the safety system may not monitor the first signal.

In some examples, a second authorization setting of the one or more authorization settings may correspond to the safety system having authorization to monitor one or more signals provided by the first device when the first device is within an area corresponding to one or more types of events. For example, the one or more types of events may correspond to music festivals, concerts, conferences, conventions, etc. In some examples, one or more locations of one or more events associated with the one or more types of events may be determined by analyzing web-based calendars, social media activity, emails and/or messages associated with one or more devices and/or user accounts to identify indications of the one or more events. For example, a time and/or a location of an event associated with the one or more types of events may be determined by identifying a calendar entry, a social media post, an email and/or a message indicative of the time and/or the location. Alternatively and/or additionally, a polygon associated with the event may be generated based upon location information associated with the event (e.g., the location information may be determined based upon web-based calendars, social media activity, emails and/or messages indicative of the event). The location information may comprise one or more of one or more addresses of one or more properties, one or more geolocations, etc. For example, the polygon may comprise a representation (e.g., a geometrical representation) of geographical boundaries associated with an area in which the event is taking place. For example, responsive to determining that the first location matches the location of the event (e.g., the first location is within the polygon) and/or a current time matches the time of the event, the first signal may be transmitted by the first device and/or the safety system may monitor the first signal. Alternatively and/or additionally, the safety system may transmit a request for a monitoring signal to the first device responsive to determining that the first location matches the location of the event and/or the current time matches the time of the event. The first device may transmit the first signal responsive to receiving the request.

In some examples, a third authorization setting of the one or more authorization settings may correspond to the safety system having authorization to monitor one or more signals provided by the first device when the first device is within a highly populated area. In some examples, one or more highly populated areas may be determined by analyzing satellite images to identify areas with population densities exceeding a threshold population density. Alternatively and/or additionally, one or more highly populated areas may be determined by analyzing cell phone activity to identify areas with cell phone activity associated with a quantity of cell phones exceeding a threshold quantity of cell phones. For example, responsive to determining that the first location is within a highly populated area, the first signal may be transmitted by the first device and/or the safety system may monitor the first signal. Alternatively and/or additionally, the safety system may transmit a request for a monitoring signal to the first device responsive to determining that the first location is within the highly populated area. The first device may transmit the first signal responsive to receiving the request.

In some examples, a fourth authorization setting of the one or more authorization settings may correspond to the safety system having authorization to monitor one or more signals provided by the first device when the first device is not located within one or more first locations associated with the first user. For example, the one or more first locations may correspond to one or more of a home of the first user, a workplace of the first user, a home of a friend of the first user, etc. In some examples, the one or more first locations may be determined based upon information (e.g., one or more of one or more addresses, one or more geolocations, etc.) input via the safety interface. In some examples, one or more polygons associated with the one or more first locations may be generated based upon the information input via the safety interface. For example, a polygon of the one or more polygons may comprise a representation (e.g., a geometrical representation) of geographical boundaries associated with a property associated with a location of the one or more first locations (e.g., the property may correspond to one or more of a home, a yard, a parking area, etc.). Responsive to determining that the first location is not within the one or more first locations (and/or is not within the one or more polygons) and/or is not within a threshold distance from the one or more first locations, the first signal may be transmitted by the first device and/or the safety system may monitor the first signal. Alternatively and/or additionally, the safety system may transmit a request for a monitoring signal to the first device responsive to determining that the first location is not within the one or more first locations and/or is not within the threshold distance from the one or more first locations. The first device may transmit the first signal responsive to receiving the request.

In some examples, the safety system may have authorization to monitor one or more signals provided by the first device during one or more times (e.g., the one or more times may correspond to one or more days, one or more times of day, one or more days of the week, one or more months of the year, etc.) The one or more times may be received via the safety interface. In an example, a fifth authorization setting of the one or more authorization settings may correspond to the safety system having authorization to monitor one or more signals provided by the first device during one or more times of day (e.g., between noon and 5:00 PM). For example, responsive to determining that a current time corresponds to a time of day of the one or more times of day, the first signal may be transmitted by the first device and/or the safety system may monitor the first signal. In an example, the safety system may transmit a request for a monitoring signal to the first device responsive to determining that the current time corresponds to a time of day of the one or more times of day. The first device may transmit the first signal responsive to receiving the request.

Alternatively and/or additionally, a sixth authorization setting of the one or more authorization settings may correspond to the safety system having authorization to monitor one or more signals provided by the first device during one or more days of the week (e.g., Monday through Friday). For example, responsive to determining that a current time corresponds to a day of the week of the one or more days of the week, the first signal may be transmitted by the first device and/or the safety system may monitor the first signal. In an example, the safety system may transmit a request for a monitoring signal to the first device responsive to determining that the current time corresponds to a day of the week of the one or more days of the week. The first device may transmit the first signal responsive to receiving the request.

Alternatively and/or additionally, a seventh authorization setting of the one or more authorization settings may correspond to the safety system having authorization to monitor one or more types of signals provided by the first device (and/or provided by one or more other devices associated with the first user). For example, the one or more types of signals may correspond to one or more of infrared signals, video signals, image signals, audio signals, biometric signals, etc. In an example, the seventh authorization setting may correspond to the safety system having authorization to monitor merely audio signals and biometric signals, but not video signals and/or image signals (or a different variation).

In some examples, responsive to determining that the safety system has authorization to monitor one or more signals provided by the first device (based upon the one or more authorization settings, the first location and/or a current time), the safety system may transmit a request for a monitoring signal to the first device. The first device may transmit the first signal responsive to receiving the request. Alternatively and/or additionally, responsive to determining that the safety system has authorization to monitor one or more signals provided by the first device, the first device may transmit the first signal to the safety system.

At 404, one or more first threat indicators may be detected within the first signal. In some examples, the one or more first threat indicators may correspond to indications that a threat to safety and/or a threat event is occurring, will occur and/or occurred. The safety system may classify information of the first signal as the one or more first threat indicators. For example, information of the first signal may be classified as being associated with the one or more first threat indicators based upon a comparison of the information of the first signal with one or more first sets of features associated with one or more threats to safety. In some examples, the one or more first sets of features may comprise one or more first sets of video features, one or more first sets of infrared features, one or more first sets of audio features and/or one or more first sets of biometric features.

In an example where the first signal comprises an image and/or a video, the image and/or the video may be classified as being associated with one or more threat objects. It may be determined that the image and/or the video (and/or one or more video frames of the video) comprises the one or more threat objects. Alternatively and/or additionally, the image and/or the video may be classified as being associated with the one or more threat objects based upon a comparison of the image and/or the video with the one or more first sets of video features. For example, the one or more first sets of video features may comprise one or more object datasets of the one or more first object datasets, one or more object datasets of the one or more second object datasets and/or one or more other object datasets associated with types of weapons and/or types of dangerous objects. A threat object of the one or more threat objects may correspond to a firearm, an explosive device, a knife, a different type of weapon, a dangerous object and/or a fire. Alternatively and/or additionally, a threat object of the one or more threat objects may correspond to a human reaction to a threat to safety, such as one or more of one or more people having facial expressions indicative of panic, one or more people hiding behind physical objects, one or more people running, one or more people running away from a fire and/or a person with a weapon, one or more people falling to the ground, etc. In some examples, the one or more threat objects may be identified and/or detected within the first image by performing one or more image processing techniques and/or one or more computer vision techniques on the image and/or the video (and/or one or more video frames of the video). For example, the image and/or the video (and/or one or more video frames of the video) may be analyzed using one or more object detection techniques (and/or one or more object segmentation techniques) to detect the one or more threat objects. Alternatively and/or additionally, the image and/or the video (and/or one or more video frames of the video) may be analyzed using one or more machine learning techniques to detect the one or more threat objects. Alternatively and/or additionally, responsive to classifying the image and/or the video (and/or one or more video frames of the video) as being associated with the one or more threat objects, one or more films and/or shows may be analyzed based upon the image and/or the video to determine whether the image and/or the video is part of a film and/or a show. The image and/or the video may not be classified as being associated with the one or more threat objects based upon a determination that the video and/or the image is part of a film and/or a show.

In an example where the first signal comprises audio, the audio may be classified as being associated with one or more sounds associated with a threat to safety. Alternatively and/or additionally, the audio may be classified as being associated with the one or more sounds based upon a comparison of the audio with the one or more first sets of audio features. For example, one or more sets of audio features of the one or more first sets of audio features may comprise information corresponding to one or more sounds of one or more types of gunshots. Alternatively and/or additionally, one or more sets of audio features of the one or more first sets of audio features may comprise information corresponding to one or more sounds of one or more types of explosions. Alternatively and/or additionally, one or more sets of audio features of the one or more first sets of audio features may comprise one or more phrases that a person may say when a threat event occurs. Alternatively and/or additionally, one or more sets of audio features of the one or more first sets of audio features may comprise information corresponding to one or more voice properties of a person when a threat event occurs. For example, one or more sets of audio features of the one or more first sets of audio features may comprise information corresponding to a speed at which a person speaks during a threat event. Alternatively and/or additionally, one or more sets of audio features of the one or more first sets of audio features may comprise information corresponding to a pitch at which a person speaks and/or produces sound during a threat event (e.g., one or more of a person screaming, crying, yelling, etc.). Alternatively and/or additionally, one or more sets of audio features of the one or more first sets of audio features may comprise information corresponding to a tone of voice of a person. Alternatively and/or additionally, one or more sets of audio features of the one or more first sets of audio features may comprise information corresponding to a power with which a person speaks and/or produces sound during a threat event (e.g., a loudness with which a person one or more of speaks, yells, screams, cries, etc.). Alternatively and/or additionally, one or more sets of audio features of the one or more first sets of audio features may comprise information corresponding to one or more types of sound produced by a person during a threat event such as one or more of a rate at which a person breathes (e.g., inhales and/or exhales), an intensity of the breathing, a person crying, a person screaming, a person moaning, etc.

In some examples, the audio may be analyzed based upon the one or more first sets of audio features to determine whether the audio matches a set of audio features of the one or more first sets of audio features. Alternatively and/or additionally, responsive to classifying the audio as being associated with a threat indicator (such as one or more sounds associated with a threat to safety), one or more audio files of one or more films, songs and/or shows may be analyzed based upon the audio to determine whether the audio is part of a film, a song and/or a show. It may be determined that the audio is not associated with a threat indicator based upon a determination that a portion of the audio that is classified as being associated with a threat indicator is part of a film, a song and/or a show.

In an example where the first signal comprises an infrared signal, the infrared signal may be classified as being associated with one or more infrared threat indicators. For example, a portion of the infrared signal may be classified as being associated with a fire, a muzzle blast and/or an explosion. In some examples, information of the first signal may be classified as being associated with the one or more infrared threat indicators based upon a comparison of the information of the first signal with the one or more first sets of infrared features. For example, the infrared signal may be analyzed based upon the one or more first sets of infrared features to determine whether at least a portion of the infrared signal matches a set of infrared features of the one or more first sets of infrared features. In some examples, a set of infrared features of the one or more first sets of infrared features may comprise information associated with a type of fire, a type of muzzle blast and/or a type of explosion (e.g., the information may correspond to characteristics and/or features of the type of fire, the type of muzzle blast and/or the type of explosion). Alternatively and/or additionally, responsive to determining that the infrared signal matches (e.g., is similar to) a set of infrared features of the one or more first sets of infrared features, the infrared signal may be classified as being associated with the set of infrared features and/or as being a threat indicator.

In an example where the first signal comprises a biometric signal, the biometric signal may be classified as being associated with one or more biometric threat indicators. In some examples, the biometric signal may be classified as being associated with the one or more threat objects based upon a comparison of the biometric signal with the one or more first sets of biometric features. In some examples, a set of biometric features of the one or more first sets of biometric features may comprise one or more of one or more heart rates associated with healthy body function, one or more heart rates associated with a health problem, one or more heart rates associated with panic and/or excitement, one or more heart activity features associated with healthy body function, one or more heart activity features associated with a health problem, one or more heart activity features associated with panic and/or excitement, one or more brain activity features associated with healthy body function, one or more brain activity features associated with a health problem, one or more brain activity features associated with panic and/or excitement, one or more rates of steps taken associated with normal activity, one or more rates of steps taken associated with unusual activity, etc. For example, a biometric threat indicator of the one or more biometric threat indicators may correspond to a heart rate exceeding a first threshold heart rate and/or being less than a second threshold heart rate. The first threshold heart rate and/or the second threshold heart rate may be determined based upon heart rate measurements associated with the first user. Alternatively and/or additionally, a biometric threat indicator of the one or more biometric threat indicators may correspond to the heart rate, heart activity, brain activity and/or a different body measurement associated with the first user being associated with panic and/or excitement. Alternatively and/or additionally, a biometric threat indicator of the one or more biometric threat indicators may correspond to the heart rate, the heart activity, the brain activity and/or a different body measurement associated with the first user having a health problem (e.g., a heart attack, a stroke, a panic attack, etc.). Alternatively and/or additionally, a biometric threat indicator of the one or more biometric threat indicators may correspond to a rate of steps taken by the first user exceeding a threshold rate of steps and/or a speed at which the first user is moving exceeding a threshold speed. For example, the rate of steps exceeding the threshold rate of steps and/or the speed exceeding the threshold speed may be indicative of the first user running away from a threat (e.g., a person with a weapon and/or a fire).

At 406, one or more second signals may be analyzed to determine a first probability of a threat event. In some examples, the one or more second signals may be analyzed to determine the first probability responsive to detecting the one or more first threat indicators. In some examples, the first probability may be indicative of a first probability that the threat event (e.g., a threat to safety) is occurring. Alternatively and/or additionally, the first probability may be indicative of a probability that the threat event occurred and/or will occur. The one or more second signals may comprise one or more signals of the one or more first signals. Alternatively and/or additionally, the one or more second signals may comprise the first signal associated with the one or more first threat indicators. Alternatively and/or additionally, the one or more second signals may comprise one or more signals other than the one or more first signals.

Responsive to detecting the one or more first threat indicators, one or more signals, of a plurality of signals received from a first plurality of devices, may be selected for inclusion in the one or more second signals for analysis to determine the first probability (e.g., the one or more signals may be selected from amongst the plurality of signals for inclusion in the one or more second signals).

In some examples, a plurality of locations associated with the first plurality of devices may be determined. In some examples, one or more devices, of the first plurality of devices, that are within a threshold distance from the first location, may be determined. For example, the plurality of locations associated with the first plurality of devices may be analyzed based upon the first location and/or the threshold distance to determine the one or more devices. One or more signals of the plurality of signals may be selected for inclusion in the one or more second signals based upon a determination that the one or more signals are received from the one or more devices that are within the threshold distance from the first location. Alternatively and/or additionally, one or more signals of the plurality of signals may be selected for inclusion in the one or more second signals based upon a determination that the safety system is authorized to monitor and/or analyze the one or more signals (e.g., the determination may be based upon one or more authorization settings associated with one or more devices associated with the one or more signals).

In some examples, a request for authorization to monitor a signal may be transmitted to an exemplary device responsive to determining that a location of the exemplary device is within the threshold distance from the first location and/or determining that the safety system is not authorized to monitor one or more signals being transmitted by the exemplary device to the safety system. The request for authorization may be indicative of a potential threat to safety associated with the one or more first threat indicators detected via the first signal. In an example where the one or more first threat indicators comprises a firearm object detected in an image, the request for authorization may comprise "There may be an armed intruder in the area. Please grant us authorization to monitor your video and audio signals to help us determine more information." A selectable input corresponding to providing the safety system with authorization to monitor the one or more signals (being transmitted by the exemplary device to the safety system) may be displayed via the exemplary device. Responsive to receiving a selection of the selectable input, the one or more signals received from the first device may be monitored and/or analyzed by the safety system to determine the first probability. For example, the one or more signals may be included in the one or more second signals. In some examples, the safety system may be authorized to monitor and/or analyze the one or more signals for a limited duration of time responsive to the selection of the selectable input.

Alternatively and/or additionally, one or more requests for authorization to monitor the one or more signals (being transmitted by the exemplary device to the safety system) may be transmitted to one or more trusted devices associated with the exemplary device. For example, the one or more trusted devices may be selected via the safety interface on the exemplary device. The one or more trusted devices may be associated with one or more people that are related to a second user associated with the exemplary device (e.g., the one or more people may be trusted by the second user). The one or more requests for authorization associated with the exemplary device may be transmitted to the one or more trusted devices responsive to detecting the one or more first threat indicators via the first signal and/or responsive to determining that the location of the exemplary device is within the threshold distance from the first location. A request for authorization of the one or more requests for authorization may comprise a selectable input corresponding to providing the safety system with authorization to monitor the one or more signals (being transmitted by the exemplary device to the safety system). Responsive to receiving a selection of the selectable input, the one or more signals received from the exemplary device may be analyzed and/or monitored to determine the first probability. For example, the one or more signals may be included in the one or more second signals. It may be appreciated that by enabling the one or more trusted devices to provide the safety system with authorization to monitor the one or more signals provided by the exemplary device may lead to benefits including avoiding distracting the second user when the second user is in a potentially dangerous situation.

In some examples, a request for a signal may be transmitted to an exemplary device responsive to determining that a location of the exemplary device is within the threshold distance from the first location and/or determining that the exemplary device is not transmitting one or more signals to the safety system. The request for a signal may be indicative of a potential threat to safety associated with the one or more first threat indicators detected via the first signal. In an example where the one or more first threat indicators comprises a firearm object detected in an image, the request for a signal may comprise "There may be an armed intruder in the area. Please send video and audio signals to help us determine more information." A selectable input corresponding to providing the safety system with one or more signals may be displayed via the exemplary device. Responsive to receiving a selection of the selectable input, the exemplary device may transmit one or more signals to the safety system. In some examples, the safety system may monitor and/or analyze the one or more signals to determine the first probability. For example, the one or more signals may be included in the one or more second signals.

Alternatively and/or additionally, one or more requests for a signal associated with the exemplary device may be transmitted to one or more trusted devices associated with the exemplary device. The one or more requests for a signal associated with the exemplary device may be transmitted to the one or more trusted devices responsive to detecting the one or more first threat indicators via the first signal and/or responsive to determining that the location of the exemplary device is within the threshold distance from the first location. A request for a signal of the one or more requests for a signal may comprise a selectable input corresponding to the exemplary device providing the safety system with one or more signals. Responsive to receiving a selection of the selectable input, a request may be transmitted to the exemplary device. The exemplary device may transmit one or more signals to the safety system based upon the request. The one or more signals may be analyzed and/or monitored to determine the first probability. For example, the one or more signals may be included in the one or more second signals.

In some examples, one or more requests for information may be transmitted to one or more second devices associated with the first location. For example, one or more locations of the one or more second devices may be within the threshold distance from the first location. In some examples, a request for information of the one or more requests for information may be indicative of a potential threat to safety associated with the one or more first threat indicators detected via the first signal. Alternatively and/or additionally, the request for information may comprise a request to confirm whether the threat event is ongoing. In an example, the request for information may comprise "An armed intruder was possibly detected in the area. Please send information of whether you think there is a threat". Alternatively and/or additionally, a second device of the one or more second devices may display one or more selectable inputs associated with the request for information. The one or more selectable inputs may be associated with one or more responses to the request for information. In an example, the one or more responses may comprise one or more of "There is a suspicious person", "I hear gunshots", "There is an active shooter", "I don't hear or see anything suspicious", etc. Information comprising one or more selections of one or more selectable inputs may be received from the second device. Alternatively and/or additionally, the information may comprise text and/or an audio recording provided by the second device (e.g., the text may be user-inputted text and/or the audio recording may be recorded via a microphone of the second device). The information may be indicative of whether the threat event is ongoing. The first probability may be determined based upon the information (e.g., the information may be received via a signal of the one or more second signals). In a scenario where a response "There is a suspicious person" is received from the second device, the first probability may be higher than in a scenario where a response "I don't hear or see anything suspicious" is received from the second device.

In some examples, the one or more second devices may be selected for transmission of the one or more requests for information responsive to a determination that the one or more locations of the one or more second devices are within the threshold distance from the first location. Alternatively and/or additionally, a device of the one or more second devices may be selected for transmission of a request for information of the one or more requests for information responsive to a determination that a person associated with the device is a security guard within the threshold distance from the first location. Alternatively and/or additionally, a device of the one or more second devices may be selected for transmission of a request for information of the one or more requests for information responsive to a determination that a person associated with the device is a worker within the threshold distance from the first location. Alternatively and/or additionally, a device of the one or more second devices may be selected for transmission of a request for information of the one or more requests for information responsive to a determination that a person associated with the device is a law enforcement official within the threshold distance from the first location. Alternatively and/or additionally, the one or more second devices may be selected for transmission of the one or more requests for information responsive to a determination that the one or more people meet an age threshold (e.g., the one or more people are older than 18 years old and/or a different age threshold).

In an example, the first location may be within a school. The one or more second devices may be selected for transmission of the one or more requests for information responsive to a determination that the one or more people are workers at the school (e.g., security personnel, administrative workers, teachers, law enforcement officials stationed at the school, etc.). It may be appreciated that by transmitting the one or more requests for information to the workers at the school (rather than transmitting the one or more requests for information to students, for example), may lead to benefits including avoiding panic among students.

In some examples, the one or more second signals may be analyzed to determine one or more second threat indicators. For example, information of the one or more second signals may be classified as being associated with the one or more second threat indicators. In some examples, the one or more second threat indicators may be determined using one or more of the techniques presented herein, such as techniques described with respect to detecting the one or more first threat indicators using the first signal.

In some examples, the first probability may be determined based upon the one or more second threat indicators. In some examples, the first probability may be determined by the safety system using one or more machine learning techniques. For example, the one or more second threat indicators may be input to a machine learning model. The machine learning model may output the first probability based upon the one or more second threat indicators. Alternatively and/or additionally, the one or more second threat indicators may be input to a Bayesian network and/or a fuzzy network. The Bayesian network and/or the fuzzy network may output the first probability based upon the one or more second threat indicators. The Bayesian network and/or the fuzzy network may output the first probability based upon the one or more second threat indicators using one or more machine learning techniques.

In some examples, the first probability may be determined based upon the first location. In an example, the one or more second signals may comprise one or more audio segments associated with threats to safety (such as explosions, gunshots, etc.). It may be determined that the first location is associated with a movie theater. A second probability that the one or more audio segments correspond to sound effects of a movie playing at the movie theater may be determined based upon the first location being at the movie theater. The first probability may be determined based upon the determination that the first location is associated with the movie theater and/or the second probability. Alternatively and/or additionally, the one or more audio segments and/or information of the one or more second signals may be compared with one or more films and/or shows to determine whether the one or more audio segments and/or information of the one or more second signals are part of a film and/or a show. The first probability may be generated based upon the determination of whether the one or more audio segments and/or the information of the one or more second signals are part of a film and/or a show.

In some examples, the first probability may be determined based upon a current time. In an example, the one or more second signals may comprise one or more audio segments associated with threats to safety (such as explosions, gunshots, etc.). It may be determined that the current time is associated with a holiday and/or a celebration associated with sounds, such as fireworks and/or firecrackers (e.g., Independence day, July 4th) and/or other sounds. A third probability that the one or more audio segments correspond to the sounds associated with the holiday may be determined based upon the one or more audio segments and/or the determination that the current time is associated with the holiday and/or the celebration. The first probability may be determined based upon the third probability and/or the determination that the current time is associated with the holiday and/or the celebration.

In some examples, the first probability may be determined based upon video and/or image information of the one or more second signals. For example, the one or more second signals may comprise one or more first video signals. It may be determined that one or more second video signals, of the one or more first video signals, are associated with one or more threat indicators (e.g., each signal of the one or more second video signals may be classified as being associated with one or more threat indicators). For example, a threat indicator may correspond to one or more threat objects detected within a signal of the one or more second video signals. Alternatively and/or additionally, a threat indicator may correspond to one or more people exhibiting a reaction to a threat (e.g., shock, panic, running away, etc.) detected within a signal of the one or more second video signals.

The first probability may be determined based upon a first quantity of video signals of the one or more second video signals. A higher quantity of video signals of the first quantity of video signals may be associated with a higher probability of the first probability. For example, in a scenario where the first quantity of video signals is equal to a first quantity, the first probability may be higher than in a scenario where the first quantity of video signals is equal to a second quantity less than the first quantity. Alternatively and/or additionally, the first probability may be determined based upon a first proportion of video signals of the one or more first video signals that are indicative of one or more threat indicators. The first proportion of video signals may be determined based upon the first quantity of video signals of the one or more second video signals and/or a second quantity of video signals of the one or more first video signals. A higher proportion of video signals of the first proportion of video signals may be associated with a higher probability of the first probability. For example, in a scenario where the first proportion of video signals is equal to a first proportion, the first probability may be higher than in a scenario where the first proportion of video signals is equal to a second proportion less than the first proportion.

In some examples, the first probability may be determined based upon audio information of the one or more second signals. For example, the one or more second signals may comprise one or more first audio signals (e.g., signals comprising audio information and/or other information). It may be determined that one or more second audio signals, of the one or more first audio signals, are associated with one or more threat indicators (e.g., each signal of the one or more second audio signals may be classified as being associated with one or more threat indicators). For example, a threat indicator may be detected within a signal of the one or more second audio signals. The threat indicator may correspond to one or more of a gunshot, an explosion, a phrase that a person may say when a threat events occurs, one or more voice properties of a person, etc.

The first probability may be determined based upon a first quantity of audio signals of the one or more second audio signals. A higher quantity of audio signals of the first quantity of audio signals may be associated with a higher probability of the first probability. For example, in a scenario where the first quantity of audio signals is equal to a first number, the first probability may be higher than in a scenario where the first quantity of audio signals is equal to a second number less than the first number. Alternatively and/or additionally, the first probability may be determined based upon a first proportion of audio signals of the one or more first audio signals that are indicative of one or more threat indicators. The first proportion of audio signals may be determined based upon the first quantity of audio signals of the one or more second audio signals and/or a second quantity of audio signals of the one or more first audio signals. A higher proportion of audio signals of the first proportion of audio signals may be associated with a higher probability of the first probability. For example, in a scenario where the first proportion of audio signals is equal to a first proportion, the first probability may be higher than in a scenario where the first proportion of audio signals is equal to a second proportion less than the first proportion.

In some examples, the first probability may be determined based upon biometric information of the one or more second signals. For example, the one or more second signals may comprise one or more first biometric signals (e.g., signals comprising biometric information and/or other information). It may be determined that one or more second biometric signals, of the one or more first biometric signals, are associated with one or more threat indicators (e.g., each signal of the one or more second biometric signals may be classified as being associated with one or more threat indicators). For example, a biometric threat indicator may correspond to heart rate exceeding and/or being less than a threshold heart rate. Alternatively and/or additionally, a biometric threat indicator may correspond to heart activity indicative of a health problem, panic and/or excitement. Alternatively and/or additionally, a biometric threat indicator may correspond to brain activity indicative of a health problem, panic and/or excitement. Alternatively and/or additionally, a biometric threat indicator may correspond to a different body measurement indicative of a health problem, panic and/or excitement.

The first probability may be determined based upon a first quantity of biometric signals of the one or more second biometric signals. A higher quantity of biometric signals of the first quantity of biometric signals may be associated with a higher probability of the first probability. For example, in a scenario where the first quantity of biometric signals is equal to a first number, the first probability may be higher than in a scenario where the first quantity of biometric signals is equal to a second number less than the first number. Alternatively and/or additionally, the first probability may be determined based upon a first proportion of biometric signals of the one or more first biometric signals that are indicative of one or more biometric threat indicators. The first proportion of biometric signals may be determined based upon the first quantity of biometric signals of the one or more second biometric signals and/or a second quantity of biometric signals of the one or more first biometric signals. A higher proportion of biometric signals of the first proportion of biometric signals may be associated with a higher probability of the first probability. For example, in a scenario where the first proportion of biometric signals is equal to a first proportion, the first probability may be higher than in a scenario where the first proportion of biometric signals is equal to a second proportion less than the first proportion.

Figure 5A:
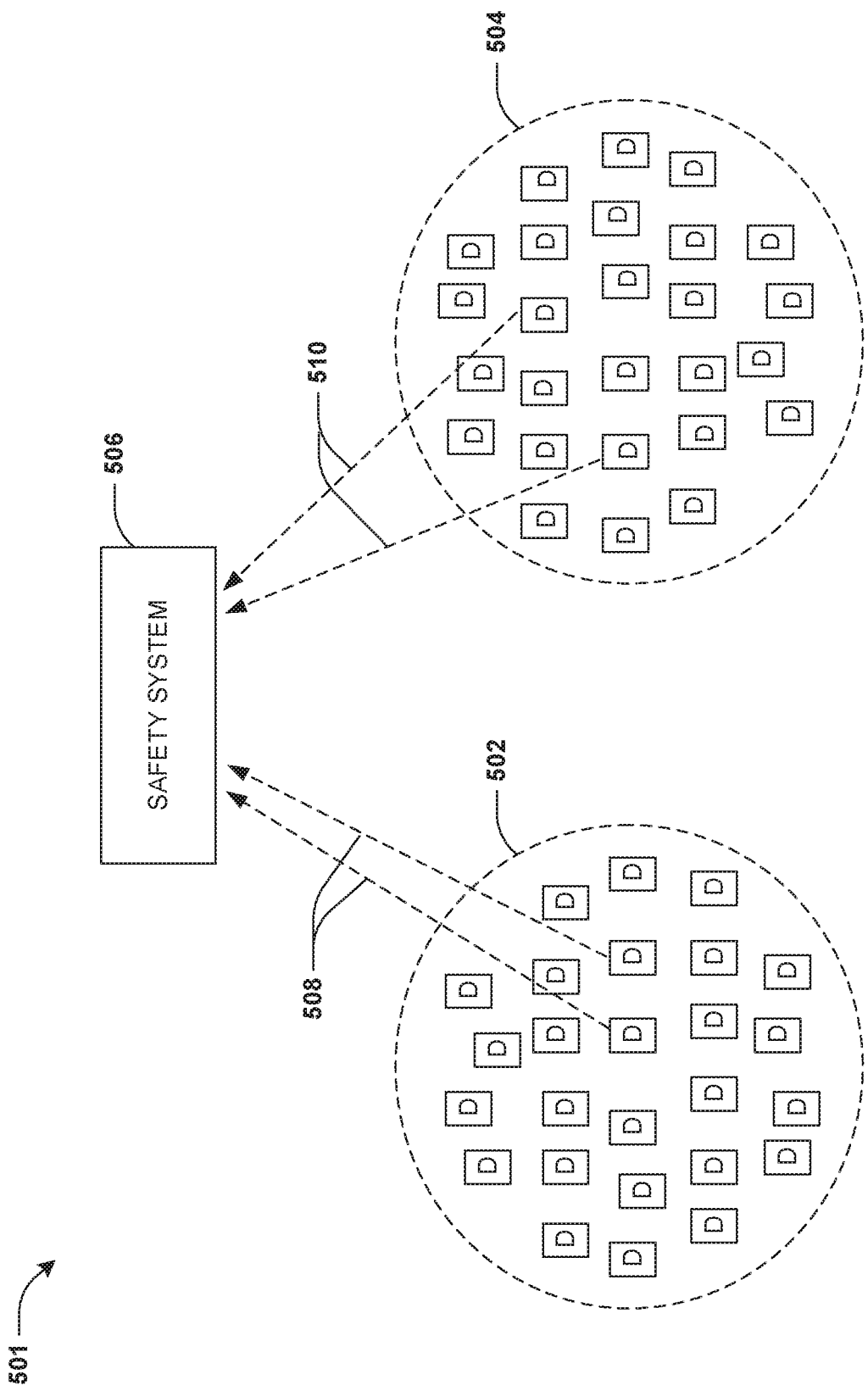
FIG. 5A is a diagram illustrating an exemplary system for detecting threat indicators and/or sending alerts, where a first set of signals and/or a second set of signals are received by a system.

FIGS. 5A-5F illustrate examples of a system 501 for detecting threat indicators and/or sending alerts described with respect to the example method 400 of FIG. 4. FIG. 5A illustrates a first set of signals 508 and/or a second set of signals 510 being received by a system 506 (e.g., the safety system). Devices illustrated in FIGS. 5A-5B may be labeled "D". The one or more first signals may comprise the first set of signals 508 and/or the second set of signals 510. In some examples, the first set of signals 508 may be received from one or more devices within a first area 502. Alternatively and/or additionally, the second set of signals 510 may be received from one or more devices within a second area 504. The first set of signals 508 and/or the second set of signals 510 may be monitored by the system 506. In some examples, one or more threat indicators may be detected within a signal of the first set of signals 508.

Figure 5B:
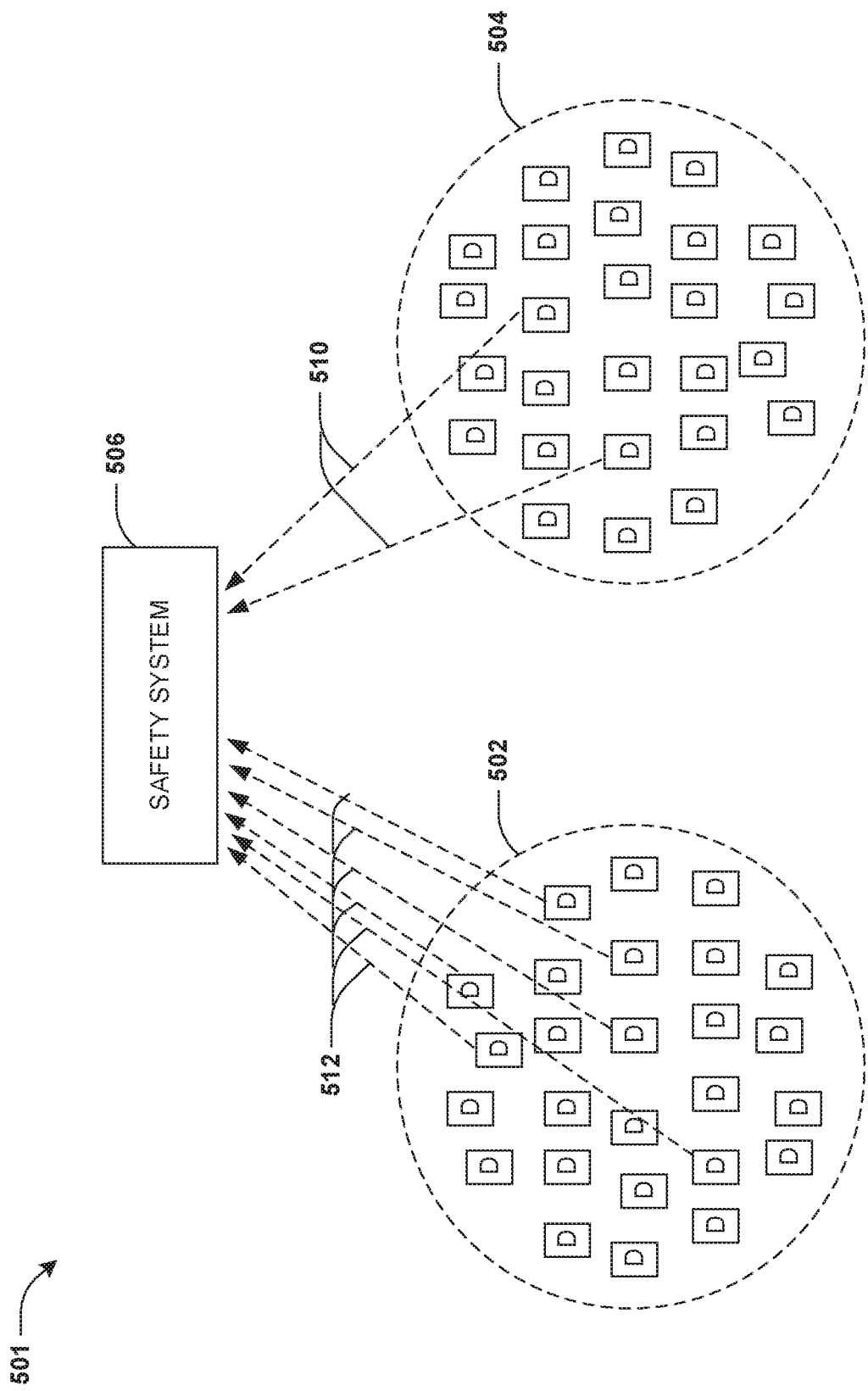
FIG. 5B is a diagram illustrating an exemplary system for detecting threat indicators and/or sending alerts, where a third set of signals is received and/or monitored by a system responsive to detecting one or more threat indicators within a signal of a first set of signals.

FIG. 5B illustrates the system 506 receiving and/or monitoring a third set of signals 512 (e.g., the one or more second signals) responsive to detecting the one or more threat indicators within the signal of the first set of signals 508. For example, the third set of signals 512 may be received from a third set of devices that are within the first area 502. The third set of signals 512 may be analyzed to determine a probability 532 (illustrated in FIG. 5C) that a threat event is occurring.

Figure 5C:
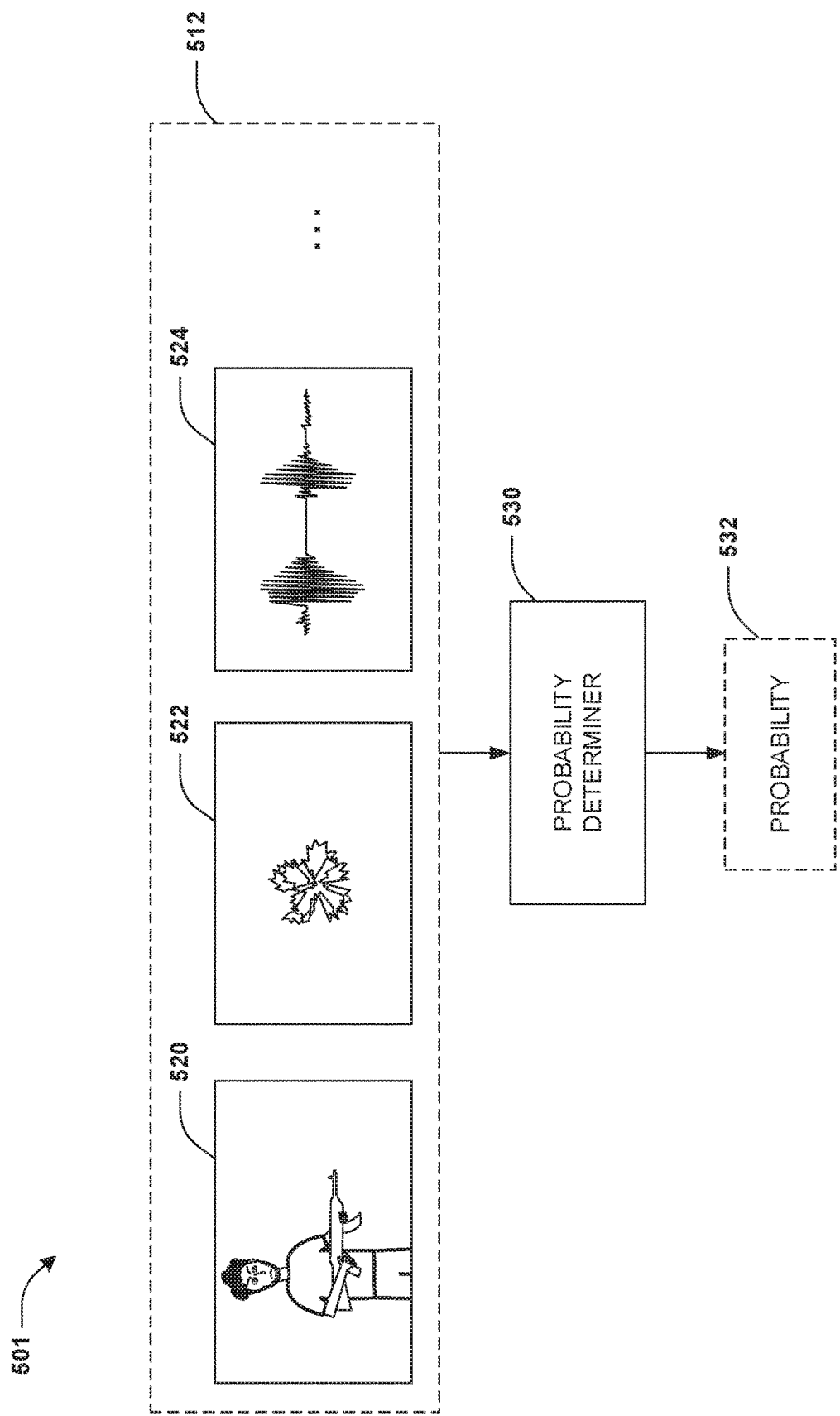
FIG. 5C is a diagram illustrating an exemplary system for detecting threat indicators and/or sending alerts, where a third set of signals are analyzed to determine a probability.

FIG. 5C illustrates the third set of signals 512 being analyzed to determine the probability 532 (e.g., the first probability). In some examples, the third set of signals 512 may comprise a video signal 520 (comprising a video and/or an image), an infrared signal 522 and/or an audio signal 524. For example, the video signal 520 may be classified as being associated with a threat object (e.g., a gun) based upon a comparison of the video signal 520 with the one or more first sets of video features. Alternatively and/or additionally, the infrared signal 522 may be classified as being associated with a muzzle blast based upon a comparison of the infrared signal 522 with the one or more first sets of infrared features. Alternatively and/or additionally, the audio signal 524 may be classified as being associated with one or more sounds associated with a threat to safety (e.g., gunshots) based upon a comparison of the audio signal 524 with the one or more first sets of audio features.

In some examples, a probability determiner 530 may determine the probability 532 based upon the third set of signals 512. The probability 532 may be determined using one or more of the techniques described herein.

At 408, one or more first alert devices of a plurality of alert devices may be selected, based upon the first probability, for transmission of one or more messages associated with the threat event. In some examples, a threat level of the threat event may be determined based upon the first probability. For example, a first range of probabilities may correspond to a first threat level of a plurality of threat levels, a second range of probabilities may correspond to a second threat level of the plurality of threat levels, etc. In an example, the threat level of the threat event may correspond to the first threat level based upon a determination that the first probability is within the first range of probabilities.

Alternatively and/or additionally, the threat level of the threat event may be determined based upon the first probability and/or the one or more second threat indicators (and/or other information of the one or more second signals). For example, the one or more second signals and/or the one or more second threat indicators may be analyzed to determine a potential loss level associated with the threat event if the threat event occurs. For example, the potential loss level may correspond to a potential magnitude of damage and/or a potential loss of life that may result from the threat event. The potential loss level associated with the threat event may be determined based upon one or more threat objects of the one or more second threat indicators and/or a population density associated with a second location associated with the threat event.

In some examples, the second location may correspond to a point and/or an area within which the threat event occurs. Alternatively and/or additionally, the second location may correspond to a place and/or an area within which one or more perpetrators and/or one or more hazards associated with the threat event are positioned. Alternatively and/or additionally, the second location may correspond to a place and/or an area within which one or more threat objects of the one or more second threat indicators are positioned and/or detected.

In some examples, the second location may be determined based upon one or more device locations of one or more devices from which one or more signals associated with one or more threat indicators are received. Alternatively and/or additionally, one or more images and/or one or more videos received from the one or more devices may be analyzed to determine one or more object locations of one or more threat objects detected within the one or more images and/or the one or more videos. The second location may be determined based upon the one or more object locations. In an example, an exemplary object location of the one or more object locations may be determined based upon an exemplary image of the one or more images and/or an exemplary device location of a device that captured the exemplary image and/or transmitted the exemplary image to the safety system. An exemplary threat object may be detected within the exemplary image. The exemplary image may be analyzed to determine a distance between the exemplary device location and the exemplary threat object. The exemplary object location of the exemplary threat object may be determined based upon the distance and the exemplary device location.

A first threat value associated with the threat event may be determined based upon the first probability and/or the potential loss level. For example, one or more operations (e.g., mathematical operations) may be performed using the first probability and/or the potential loss level to determine the first threat value. In some examples, the threat level may be determined based upon the first threat value. For example, a first range of threat values may correspond to the first threat level of the plurality of threat levels, a second range of threat values may correspond to the second threat level of the plurality of threat levels, etc. For example, the threat level may correspond to the first threat level based upon a determination that the first threat value is within the first range of threat values.

In some examples, each threat level of the plurality of threat levels may be associated with one or more alert devices of the plurality of alert devices. For example, the plurality of alert devices may comprise one or more devices associated with emergency personnel, such as one or more of one or more devices associated with law enforcement associated with the second location (e.g., a police force having jurisdiction over an area surrounding the second location), one or more devices associated with medical emergency personnel (e.g., paramedics, emergency medical technicians, etc.), one or more devices associated with firefighters, one or more devices associated with rescuers, one or more devices associated with first responders, etc.

Alternatively and/or additionally, the plurality of alert devices may comprise one or more devices associated with security personnel at the second location and/or within a second threshold distance from the second location. Alternatively and/or additionally, the plurality of alert devices may comprise one or more devices associated with workers at the second location and/or within the second threshold distance from the second location. Alternatively and/or additionally, the plurality of alert devices may comprise one or more third devices within the second location and/or within the second threshold distance from the second location. For example, the one or more third devices may be associated with people that may be in danger due to the threat event (e.g., the threat event may pose a risk to the people, such as a risk of injury and/or harm).

In some examples, the first threat level may be associated with one or more first alert devices of the plurality of alert devices. In an example, the one or more first alert devices may comprise one or more devices associated with security personnel. Alternatively and/or additionally, the second threat level may be associated with one or more second alert devices of the plurality of alert devices. The second threat level may be higher than the first threat level. In an example, the one or more second alert devices may comprise one or more devices associated with security personnel and/or one or more devices associated with emergency personnel. Alternatively and/or additionally, a third threat level of the plurality of threat levels may be associated with one or more third alert devices of the plurality of alert devices. The third threat level may be higher than the second threat level. In an example, the one or more third alert devices may comprise one or more devices associated with security personnel, one or more devices associated with emergency personnel and/or one or more devices associated with workers. Alternatively and/or additionally, a fourth threat level of the plurality of threat levels may be associated with one or more fourth alert devices of the plurality of alert devices. The fourth threat level may be higher than the third threat level. In an example, the one or more fourth alert devices may comprise one or more devices associated with security personnel, one or more devices associated with emergency personnel, one or more devices associated with workers and/or the one or more third devices associated with people that may be in danger.

In an example, the threat level of the threat event may correspond to the first threat level. In the example, one or more messages may be transmitted to one or more devices associated with security personnel. In another example, the threat level of the threat event may correspond to the second threat level. In the example, one or more messages may be transmitted to one or more devices associated with security personnel and/or one or more devices associated with emergency personnel.

In an example where one or more messages are transmitted to the one or more third devices associated with people that may be in danger (such as where the threat level of the threat event corresponds to the fourth threat level), a first message of the one or more messages may be transmitted to a second device of the one or more third devices. In some examples, the safety interface may be displayed via the second device responsive to receiving the first message.

In some examples, the first message and/or the safety interface may display location information. The location information may be indicative of a location of the second device. Alternatively and/or additionally, the location information may be indicative of the second location associated with the threat event. Alternatively and/or additionally, the location information may be indicative of a danger area surrounding the second location within which people may be in danger of receiving injury. In some examples, the first message and/or the safety interface may instruct and/or indicate for a person associated with the second device to leave the danger area (e.g., the first message may comprise "Leave this area" adjacent to and/or overlaying a representation of the danger area and/or the location of the second device). In some examples, responsive to receiving the first message, sound (e.g., notifications sounds) of the second device may be disabled (automatically) to assist the person in remaining hidden.

In some examples, the first message and/or the safety interface may display directions to guide the person outside of the danger area. In an example where the person is within a building, a map of the building (e.g., a blueprint) may be analyzed to determine a path for the person to exit the building while moving away from the second location associated with the threat event. For example, the path may comprise one or more hallways, doors, windows, stairs and/or rooms through which the person may go to exit the building and/or leave the danger area. Alternatively and/or additionally, responsive to determining that the person has one or more handicaps (such as preventing the person from moving down stairs), the path may be configured (based upon the blueprint) to comprise one or more areas that are handicap accessible. In some examples, the first message and/or the safety interface may display a map-view of the path for the person to take. Alternatively and/or additionally, the first message and/or the safety interface may display step-by-step navigational instructions. For example, a first step of the step-by-step navigational instructions may comprise "proceed down the hallway until you reach a door at the end". A second step of the step-by-step navigational instructions may be displayed responsive to the person reaching the door at the end of the hallway. The second step may comprise "open the door and turn left and go until you reach the doors exiting the building".

Alternatively and/or additionally, responsive to determining that the second location associated with the threat event is within a third threshold distance from the location of the second device, the first message and/or the safety interface may display directions to hide. For example, a room that the person may use to hide from a perpetrator may be determined via the map of the building. The first message and/or the safety interface may display a location of the room and/or the location of the second device. Alternatively and/or additionally, the first message and/or the safety interface may display directions for the person to reach the room. Alternatively and/or additionally, the first message and/or the safety interface may display an area within the room where the person may hide (e.g., the area may be adjacent to a wall). Alternatively and/or additionally, the first message and/or the safety interface may display one or more actions the person may take to avoid being hurt in the room (e.g., one or more of the person should not move, the person should hide behind a table, the person should turn off the lights, the person should not make noise, etc.).

In some examples, the first message and/or the safety interface may display guidelines for actions the person may take to avoid being hurt. For example, the guidelines may be generated based upon and/or retrieved from one or more safety information databases (e.g., the one or more safety information databases may be produced by organizations and/or government agencies for purposes of educating people on how to stay safe during threat events). In an example, the guidelines may comprise "leave your belongings and get away as quickly as you can because getting away from the threat is your top priority". In another example, the guidelines may comprise "when you exit the building, keep your hands visible and/or empty so that you are not identified as a threat by law enforcement".

In some examples, one or more statuses may be transmitted to one or more fourth devices associated with the second device in order to inform one or more people associated with the one or more fourth devices of a status of the person associated with the second device during and/or after the threat event. In some examples, the one or more fourth devices may be selected via the safety interface on the second device (by the person). In an example, the one or more people may correspond to family members and/or friends of the person. In some examples, a first status of the one or more statuses may be indicative of the person moving (e.g., the first status may be determined based upon movement of the location of the second device and/or based upon a biometric signal received from the second device). Alternatively and/or additionally, a second status of the one or more statuses may be indicative of a heart rate of the person, heart activity of the person, brain activity of the person and/or one or more other body measurements of the person (e.g., the second status may be determined based upon the biometric signal received from the second device). Alternatively and/or additionally, a third status of the one or more statuses may be indicative of the person being within the danger area (and/or the building) associated with the threat event (e.g., the third status may be determined based upon the location of the second device). Alternatively and/or additionally, a fourth status of the one or more statuses may be indicative of the person being outside of the danger area and/or the building (e.g., the fourth status may be determined based upon the location of the second device). Alternatively and/or additionally, location information associated with the second device may be displayed via a device of the one or more fourth devices. The location information may be indicative of the location of the second device. Alternatively and/or additionally, the location information may be indicative of the second location associated with the threat event. Alternatively and/or additionally, the location information may be indicative of the danger area. It may be appreciated that by providing the one or more statuses and/or the location information to the one or more fourth devices may enable the one or more people to determine a status of the person without having to contact (e.g., call and/or text message) the person during and/or after the threat event.

In an example where one or more messages are transmitted to security personnel and/or emergency personnel, a second message of the one or more messages may be transmitted to a third device associated with a security worker and/or an emergency responder. In some examples, the safety interface may be displayed via the third device responsive to receiving the second message.

In some examples, the second message and/or the safety interface may display location information. The location information may be indicative of a location of the third device, the second location associated with the threat event and/or the danger area surrounding the second location. Alternatively and/or additionally, the location information may be indicative of one or more locations of the one or more third devices associated with people that may be in danger. Accordingly, emergency personnel and/or security personnel may be informed of where the people in danger are positioned. In an example where the second location is within a building and/or directions to guide people outside of the danger area are provided to the one or more third devices, the location information may be indicative of one or more paths that people in danger may take to leave the danger area and/or exit the building. Accordingly, emergency personnel and/or security personnel may be informed of where the people in danger are going and/or which exits they may take to exit the building. Thus, the emergency personnel and/or the security personnel may be able to reach and/or assist one or more people that are in danger quickly.

In some examples, the second message and/or the safety interface may display one or more images and/or videos of the one or more second signals. Alternatively and/or additionally, the second message and/or the safety interface may display one or more graphical representations of the one or more second threat indicators (e.g., the one or more graphical representations may comprise an image and/or a video comprising a threat object). Alternatively and/or additionally, the second message and/or the safety interface may display one or more descriptions of the one or more second threat indicators. Alternatively and/or additionally, the second message and/or the safety interface may output an audio segment of the one or more second signals classified as being associated with one or more sounds associated with a threat to safety.

Figure 5D:
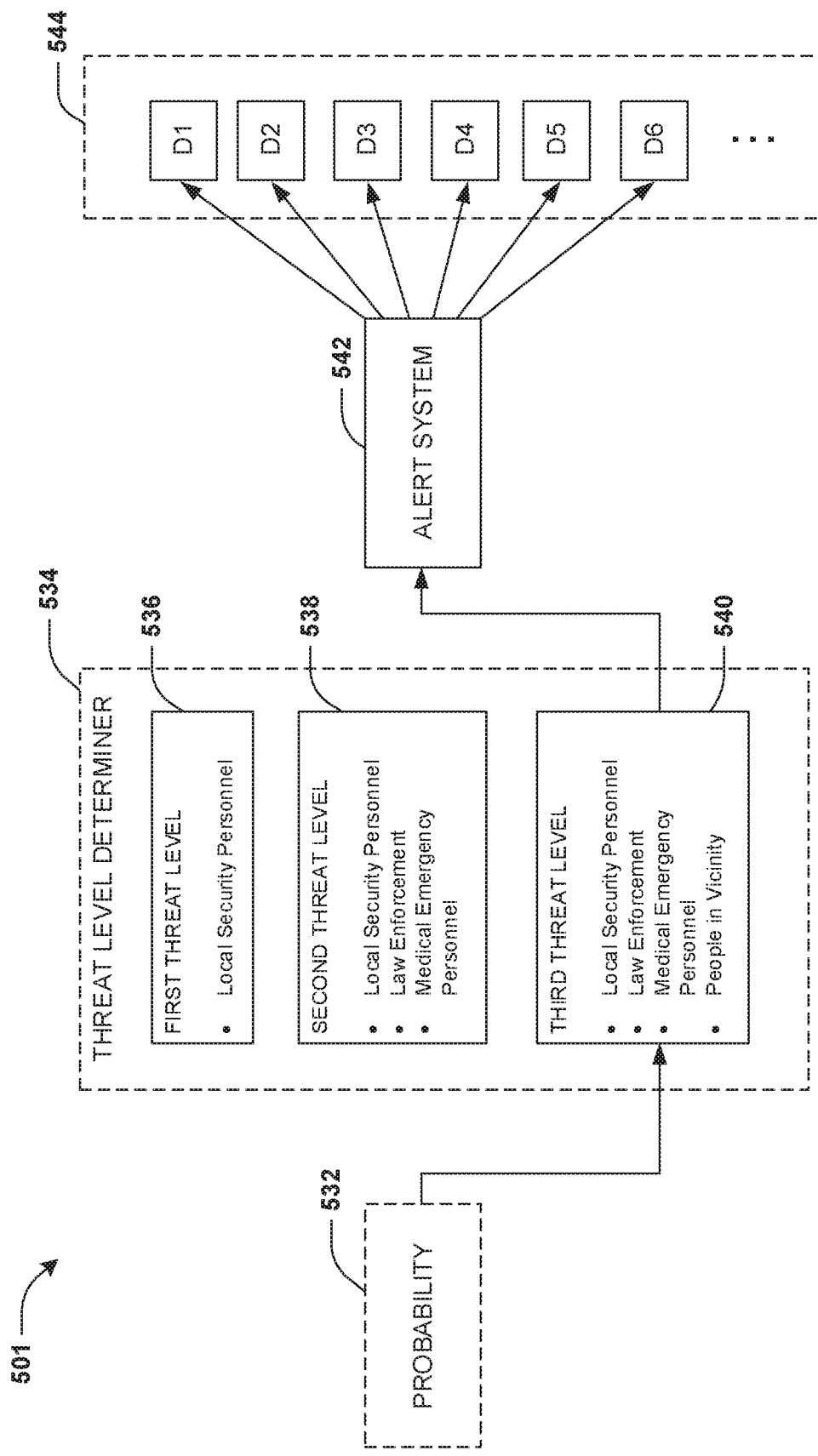
FIG. 5D is a diagram illustrating an exemplary system for detecting threat indicators and/or sending alerts, where messages are transmitted to a fourth set of devices based upon a probability.

FIG. 5D illustrates messages being transmitted to a fourth set of devices 544 based upon the probability 532. For example, a threat level determiner 534 may determine a threat level associated with the threat event based upon the probability 532. In some examples, the threat level determiner 534 may determine that the threat level corresponds to a third threat level 540 from amongst a first threat level 536, a second threat level 538 and/or the third threat level 540 based upon a determination that the probability 532 is within a range of probabilities associated with the third threat level 540. In some examples, the first threat level 536 may correspond to alerting security personnel associated with the first area 502. Alternatively and/or additionally, the second threat level 538 may correspond to alerting the security personnel, law enforcement and/or medical emergency personnel. Alternatively and/or additionally, the third threat level 540 may correspond to alerting the security personnel, law enforcement, medical emergency personnel and/or people in danger (e.g., people within the first area 502).

In some examples, an alert system 542 may transmit messages to the fourth set of devices 544 based upon the third threat level 540. For example, the fourth set of devices 544 may comprise one or more devices associated with the security personnel, one or more devices associated with the law enforcement, one or more devices associated with the medical emergency personnel and/or one or more devices associated with people in danger.

Figure 5E:
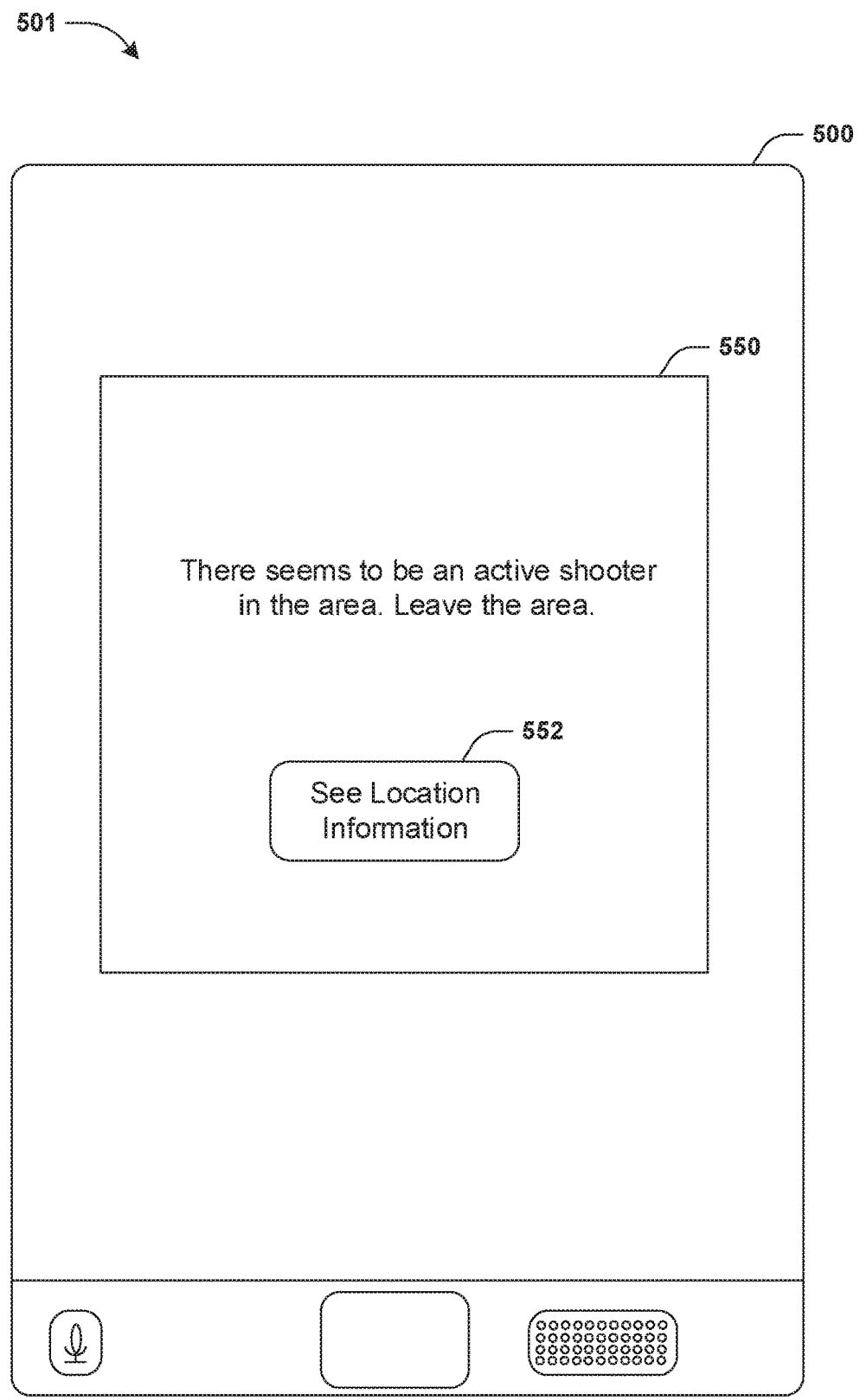
FIG. 5E is a diagram illustrating an exemplary system for detecting threat indicators and/or sending alerts, where a message transmitted by an alert system is displayed via a device of a fourth set of devices.

FIG. 5E illustrates a message 550 transmitted by the alert system 542 being displayed via a device 500 of the fourth set of devices 544. In some examples, the device 500 may be associated with a person that is in danger (e.g., the person and/or the device 500 may be within the first area 502). The message 550 may be indicative of the threat event. Alternatively and/or additionally, the message 550 may comprise a selectable input 552 corresponding to presenting location information via the device 500. The location information may be associated with the threat event. In some examples, a selection of the selectable input 552 may be received.

Figure 5F:
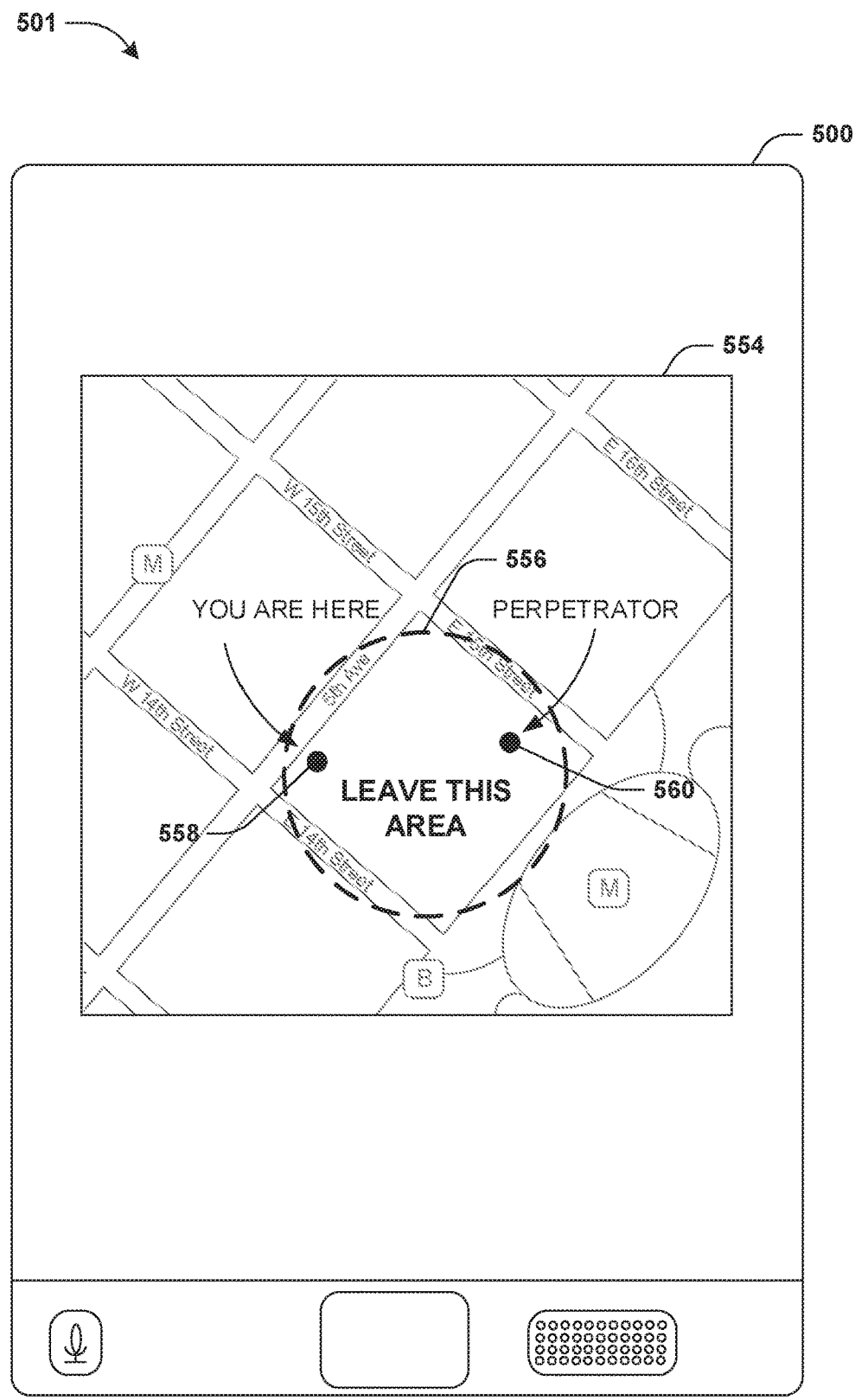
FIG. 5F is a diagram illustrating an exemplary system for detecting threat indicators and/or sending alerts, where a device displays a location interface comprising location information.

FIG. 5F illustrates the device 500 displaying a location interface 554 comprising the location information associated with the threat event. For example, the location interface 554 may be displayed responsive to receiving the selection of the selectable input 552. In some examples, the location interface 554 may be indicative of a location 558 of the device 500, a location 560 associated with the threat event (e.g., a location of a perpetrator of the threat event) and/or a danger area 556 surrounding the location 560. Alternatively and/or additionally, the location interface 554 may display an instruction to leave the danger area 556.

In some examples, feedback may be received from one or more devices. For example, the safety interface may display a feedback interface via a fourth device associated with security personnel and/or emergency personnel. The feedback may be received via the feedback interface. The feedback may be indicative of whether the threat event occurred (and/or whether the threat event was incorrectly detected).

In some examples, information of the one or more first signals and/or the one or more second signals may be analyzed to determine one or more first features associated with the information. The one or more first features may comprise one or more audio features, one or more video features, one or more infrared features and/or one or more biometric features. In some examples, the one or more first sets of features used for identifying threat indicators may be updated based upon the one or more first features to generate one or more second sets of features. In some examples, the one or more second sets of features may comprise one or more second sets of video features, one or more second sets of infrared features, one or more second sets of audio features and/or one or more second sets of biometric features.

Whether the threat event is correctly detected and/or identified may be determined based upon the feedback. In an example where the threat event is correctly identified and/or detected using the one or more first sets of features, the one or more first sets of features may be updated by modifying one or more features of the one or more first sets of features based upon one or more features of the one or more first features to generate the one or more second sets of features. Alternatively and/or additionally, in an example where the threat event is correctly identified and/or detected using the one or more first sets of features, the one or more first sets of features may be updated by adding one or more features of the one or more first sets of features to the one or more first sets of features to generate the one or more second sets of features.

In an example where the threat event is incorrectly identified and/or detected using the one or more first sets of features, the one or more first sets of features may be updated by modifying one or more features of the one or more first sets of features to generate the one or more second sets of features. The one or more features may be modified responsive to a determination that the one or more features were used in incorrectly identifying and/or detecting the threat event. For example, the one or more features may be modified to mitigate instances where threat events are incorrectly identified and/or detected. Alternatively and/or additionally, in an example where the threat event is incorrectly identified using the one or more first sets of features, the one or more first sets of features may be updated by removing one or more features from the one or more first sets of features. The one or more features may be removed responsive to a determination that the one or more features were used in incorrectly identifying and/or detecting the threat event. For example, the one or more features may be removed to mitigate instances where threat events are incorrectly identified and/or detected.

In an example, one or more third signals received from one or more devices may be monitored. The one or more third signals may be received and/or monitored after the one or more first sets of features are updated to generate the one or more second sets of features. Information of a signal of the one or more third signals may be classified as being associated with one or more third threat indicators based upon a comparison of the information of the signal with the one or more second sets of features. By using the one or more second sets of features to classify the information and/or to detect the one or more third threat indicators may result in more accurately detecting a second threat event as opposed to using the one or more first sets of features.

It may be appreciated that updating the one or more first sets of features to generate the one or more second sets of features based upon the feedback and/or the one or more first features may create a closed-loop process allowing results of threat event detection and/or threat event identification to be used as feedback to tailor parameters of the safety system (such as modifying, removing and/or adding one or more features for detecting and/or identifying threat indicators and/or threat events). Closed-loop control may reduce errors and produce more efficient operation of a computer system which implements the safety system. The reduction of errors and/or the efficient operation of the computer system may improve operational stability and/or predictability of operation. Accordingly, using processing circuitry to implement closed loop control described herein may improve operation of underlying hardware of the computer system.

In some examples, one or more of the techniques described herein may be performed within a mobile edge computing network architecture and/or a multi-access edge computing (MEC) network architecture. One or more computing programs and/or data associated with the safety system may be deployed at a network node, such as a cellular base station and/or a different edge node. In an example, one or more services of the safety system described herein may be provided by the network node. For example, the network node may be connected (e.g., directly connected and/or indirectly connected) to a plurality of devices associated with the safety system. The network node may provide cellular coverage to the plurality of devices within a coverage area of the network node. The network node may be closer to the plurality of devices than a core network. One or more of the operations of the safety system described herein, such as one or more of monitoring signals, detecting threat indicators, determining a probability of a threat event, selecting devices for transmission of messages, transmitting messages to devices, etc. may be performed using a computer system at the network node. It may be appreciated that using the computer system at the network node to perform one or more of the operations described herein may result in an increased speed of reception and/or delivery of signals and/or an increased speed in analyzing and/or classifying information of received signals. Alternatively and/or additionally, using the computer system at the network node to perform one or more of the operations presented herein may result in a reduced latency between transmission of a signal by a device to the safety system and classification of information of the signal as being associated with a threat indicator, for example. Accordingly, a threat event may be identified and/or detected with an increased speed and/or messages for alerting one or more people of the threat event may be transmitted to one or more devices with an increased speed.

In some examples, one or more computing programs and/or data associated with the safety system may be transferred to a computing system at a network node, such as a cellular base station and/or a different edge node. For example, the one or more computing programs and/or the data may be transferred to the computing system at the network node responsive to determining that an event is scheduled within a coverage area of the network node (e.g., the coverage area may correspond to an area within which cellular coverage is provided to cellular devices). For example, the event may correspond to one or more of a music festival, a concert, a conference, a convention, etc. In some examples, a location and/or a time of the event may be determined by analyzing web-based calendars, social media activity, emails and/or messages associated with one or more devices and/or user accounts. The one or more computing programs and/or the data may be transferred to the computing system at the network node responsive to determining that the location of the event is within the coverage area. One or more signals received from one or more devices associated with the location of the event may be monitored by the computing system at the network node for detection of a threat event.

In some examples, one or more of the techniques described herein may be implemented using one or more cellular network technologies. For example, one or more signals may be received by the safety system using second-generation cellular technology (2G), third-generation cellular technology (3G), fourth-generation cellular technology (4G) and/or fifth-generation cellular technology (5G). Alternatively and/or additionally, one or more signals may be transmitted by the safety system using 2G, 3G, 4G and/or 5G. It may be appreciated that using a 5G system to perform one or more of the operations described herein may result in an increased speed of reception and/or delivery of signals and/or an increased speed in analyzing and/or classifying information of received signals. Alternatively and/or additionally, using a 5G system to perform one or more of the operations presented herein may result in a reduced latency between transmission of a signal by a device to the safety system and classification of information of the signal as being associated with a threat indicator, for example. Accordingly, a threat event may be identified and/or detected with an increased speed. Alternatively and/or additionally, messages for alerting one or more people of the threat event may be transmitted to one or more devices with an increased speed.

Implementation of at least some of the disclosed subject matter may lead to benefits including, but not limited to, more accurately identifying and/or detecting threat events (e.g., as a result of monitoring one or more signals, as a result of by classifying information of a signal of the one or more signals as being associated with the one or more threat indicators based upon one or more first sets of features, as a result of updating the one or more first sets of features based upon feedback to generate one or more second sets of features for use in detecting threat indicators within signals, etc.).

Alternatively and/or additionally, implementation of at least some of the disclosed subject matter may lead to benefits including more precise transmission of messages to devices responsive to identifying and/or detecting a threat event (e.g., as a result of determining a probability of the threat event and/or a potential loss level associated with the threat event, as a result of determining a threat level based upon the probability and/or the potential loss level, as a result of transmitting one or more messages to one or more alert devices associated with the threat level, etc.).

Alternatively and/or additionally, implementation of at least some of the disclosed subject matter may lead to benefits including preventing and/or mitigating losses (such as injury, loss of life and/or other harm) caused by threat events. For example, losses may be prevented and/or mitigated as a result of transmitting one or more messages to one or more alert devices associated with the threat level. A message of the one or more messages may be transmitted to a device associated with a person in danger. The message may comprise location information indicative of a location of the person, a location of the threat event and/or a danger area within which the person is in danger. The message may comprise guidelines to avoid harm. The message may comprise a path that the person may take to leave the danger area. Accordingly, the message may enable the person to be aware of the location of the threat event, a path to leave the danger area and/or one or more actions they should take to avoid harm. Alternatively and/or additionally, a second message of the one or more messages may be transmitted to a device associated with emergency personnel and/or security personnel. The second message may comprise second location information indicative of one or more locations of one or more people in danger, the location of the threat event and/or the danger area within which people are in danger. The second location information may comprise one or more areas (e.g., exits of a building) to which one or more people in danger may go to leave the danger area. Accordingly, the second message may enable the emergency personnel and/or the security personnel to be aware of locations where people in danger are positioned, locations where people in danger may go to leave the danger area and/or the location of the threat event. Thus, the second message may enable the emergency personnel and/or the security personnel to effectively assist the people in danger and/or effectively confront the threat event.

In some examples, at least some of the disclosed subject matter may be implemented on a client device, and in some examples, at least some of the disclosed subject matter may be implemented on a server (e.g., hosting a service accessible via a network, such as the Internet).

Figure 6:
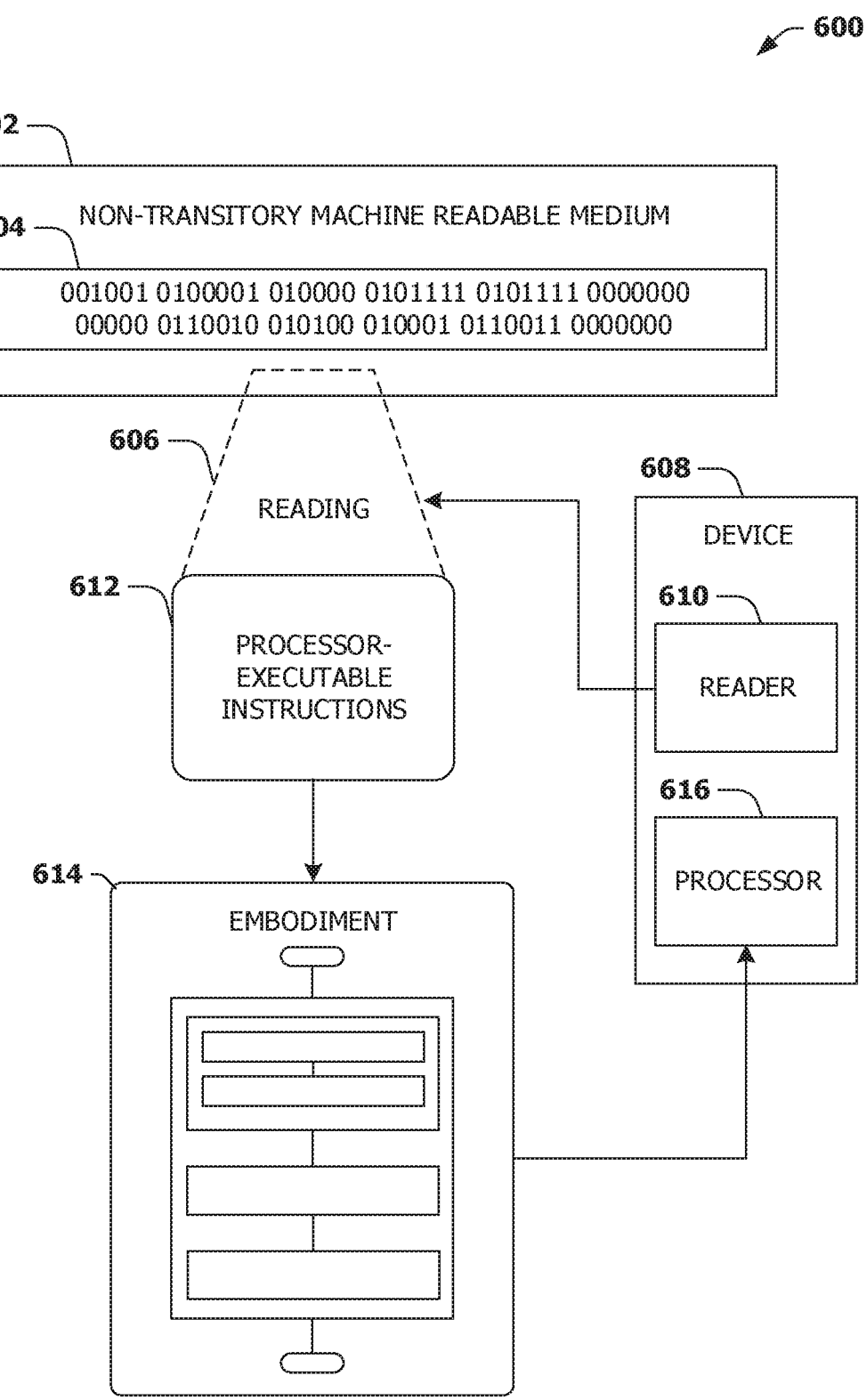
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    monitoring one or more first sensor signals received from one or more first devices for detection of a threat indicator;
    evaluating, by a processor, the one or more first sensor signals and based upon the evaluating:
        detecting one or more first threat indicators, corresponding to an occurrence of a threat event, within a first signal of the one or more first sensor signals being monitored;
    responsive to the detecting the one or more first threat indicators, corresponding to the occurrence of the threat event, within the first signal received from the one or more first devices based upon the evaluating the one or more first sensor signals, analyzing one or more second sensor signals received from one or more second devices to determine a probability of the threat event, wherein the one or more second sensor signals are different than the one or more first sensor signals and the one or more second devices are different than the one or more first devices; and
    selecting, based upon the probability of the threat event, one or more devices of a plurality of devices for transmission of one or more messages associated with the threat event, wherein the selecting comprises selecting one or more third devices based upon the probability being within one or more first probabilities or selecting one or more fourth devices based upon the probability being within one or more second probabilities different than the one or more first probabilities, wherein the one or more fourth devices comprise at least one device not in the one or more third devices.

2. The method of claim 1, wherein the one or more third devices, associated with the one or more first probabilities, are associated with first personnel, and wherein the one or more fourth devices, associated with the one or more second probabilities, comprise at least one device not associated with the first personnel.

3. The method of claim 1, wherein the one or more fourth devices, selected based upon the probability being within the one or more second probabilities, comprise at least one device in the one or more third devices.

4. The method of claim 1, comprising:
    controlling a graphical user interface of a first device to display a safety interface; and
    receiving, via the safety interface, authorization to monitor one or more signals provided by the first device when the first device is within one or more authorized locations.

5. The method of claim 1, wherein the one or more third devices, associated with the one or more first probabilities, are associated with first personnel, and wherein the one or more fourth devices, associated with the one or more second probabilities, comprise at least one device associated with second personnel.

6. The method of claim 4, comprising:
prior to the monitoring the one or more first sensor signals:
determining a first location of the first device; and
responsive to determining that the first location is within the one or more authorized locations, transmitting a request for a signal to the first device, wherein the first signal is received from the first device responsive to the transmitting the request.

7. The method of claim 1, comprising:
determining a first location associated with a first device associated with the first signal;
responsive to the detecting the one or more first threat indicators, transmitting a request for a signal to a second device associated with the first location; and
receiving a second signal of the one or more second sensor signals from the second device.

8. The method of claim 1, comprising:
determining a first threat level based upon the probability, wherein the selecting the one or more devices is performed based upon a determination that the one or more devices are associated with the first threat level.

9. The method of claim 1, wherein:
the first signal comprises an infrared signal; and
the detecting the one or more first threat indicators comprises classifying information of the first signal as being associated with a muzzle flash.

10. The method of claim 1, wherein:
the first signal comprises a video signal; and
the detecting the one or more first threat indicators comprises classifying information of the first signal as being associated with one or more threat objects.

11. The method of claim 1, wherein:
the first signal comprises an audio signal; and
the detecting the one or more first threat indicators comprises classifying information of the first signal as being associated with one or more sounds associated with a threat to safety.

12. The method of claim 1, wherein the detecting the one or more first threat indicators comprises:
classifying information of the first signal as being associated with the one or more first threat indicators based upon a comparison of the information of the first signal with one or more sets of features associated with one or more threats to safety.

13. The method of claim 12, wherein the one or more sets of features comprise at least one of:
a set of infrared features;
a set of video features;
a set of biometric features; or
a set of audio features.

14. The method of claim 12, comprising:
analyzing the information of at least one of the first signal or the one or more second sensor signals to determine one or more features; and
updating the one or more sets of features based upon the one or more features to generate one or more second sets of features.

15. The method of claim 14, wherein the one or more features comprise at least one of:
one or more infrared features;
one or more video features;
one or more biometric features; or
one or more audio features.

16. The method of claim 14, wherein the one or more third devices, associated with the one or more first probabilities, are associated with at least one of security personnel, emergency personnel or workers, and wherein the one or more fourth devices, associated with the one or more second probabilities, comprise at least one device associated with people determined to be in danger.

17. The method of claim 1, comprising:
determining a first location associated with the threat event based upon the one or more second sensor signals; and
transmitting the one or more messages to the one or more devices, wherein a message of the one or more messages is indicative of the first location.

18. A computing device comprising:
a processor; and
memory comprising processor-executable instructions that when executed by the processor cause performance of operations, the operations comprising:
monitoring one or more first sensor signals received from one or more first devices;
evaluating the one or more first sensor signals and based upon the evaluating:
classifying information of a first signal of the one or more first sensor signals as being associated with one or more first threat indicators, corresponding to an occurrence of a threat event, based upon a comparison of the information of the first signal with one or more sets of features associated with one or more threats to safety;
responsive to the classifying the information of the first signal received from the one or more first devices as being associated with the one or more first threat indicators corresponding to the occurrence of the threat event based upon the evaluating the one or more first sensor signals, analyzing one or more second sensor signals received from one or more second devices to determine a probability of the threat event, wherein the one or more second devices are different than the one or more first devices; and
selecting, based upon the probability of the threat event, one or more devices of a plurality of devices for transmission of one or more messages associated with the threat event, wherein the selecting comprises selecting one or more third devices based upon the probability being within one or more first probabilities or selecting one or more fourth devices based upon the probability being within one or more second probabilities different than the one or more first probabilities, wherein the one or more fourth devices comprise at least one device not in the one or more third devices.

19. A non-transitory machine readable medium having stored thereon processor-executable instructions that when executed cause performance of operations, the operations comprising:
monitoring one or more first signals received from one or more first devices for detection of a threat indicator;
evaluating the one or more first signals and based upon the evaluating:
detecting one or more first threat indicators, corresponding to an occurrence of a threat event, within a first signal of the one or more first signals being monitored;
responsive to the detecting the one or more first threat indicators, corresponding to the occurrence of the threat event, within the first signal received from the one or more first devices based upon the evaluating the one or more first signals, analyzing one or more second sensor signals received from one or more second devices to determine a probability of the threat event, wherein the one or more second devices are different than the one or more first devices;

selecting, based upon the probability of the threat event, one or more devices of a plurality of devices, wherein the selecting comprises selecting one or more third devices based upon the probability being within one or more first probabilities or selecting one or more fourth devices based upon the probability being within one or more second probabilities different than the one or more first probabilities; and transmitting, one or more messages associated with the threat event to the one or more devices.

20. The non-transitory machine readable medium of claim 19, the operations comprising:

determining a first location associated with a first device associated with the first signal; and responsive to the detecting the one or more first threat indicators, selecting one or more signals for inclusion in the one or more second sensor signals based upon a determination that one or more locations of one or more fifth devices associated with the one or more signals are associated with the first location.

* * * * *